United States Patent
Lu et al.

(10) Patent No.: US 10,529,076 B2
(45) Date of Patent: Jan. 7, 2020

(54) IMAGE PROCESSING APPARATUS AND IMAGE PROCESSING METHOD

(71) Applicant: SONY CORPORATION, Tokyo (JP)

(72) Inventors: Ying Lu, Tokyo (JP); Yasutaka Hirasawa, Tokyo (JP); Yuhi Kondo, Kanagawa (JP); Ayaka Nakatani, Kanagawa (JP); Akihiko Kaino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 137 days.

(21) Appl. No.: 15/569,259

(22) PCT Filed: Mar. 1, 2016

(86) PCT No.: PCT/JP2016/056193
§ 371 (c)(1),
(2) Date: Oct. 25, 2017

(87) PCT Pub. No.: WO2016/181687
PCT Pub. Date: Nov. 17, 2016

(65) Prior Publication Data
US 2018/0122086 A1 May 3, 2018

(30) Foreign Application Priority Data

May 14, 2015 (JP) .................................. 2015-099021

(51) Int. Cl.
*G06K 9/00* (2006.01)
*G06T 7/246* (2017.01)
(Continued)

(52) U.S. Cl.
CPC ................ *G06T 7/246* (2017.01); *G06T 7/20* (2013.01); *G06T 7/579* (2017.01); *G06T 7/73* (2017.01);
(Continued)

(58) Field of Classification Search
CPC ............. G01N 23/04; G01N 2223/309; G01N 2223/6113; G01N 2223/6116;
(Continued)

(56) References Cited

U.S. PATENT DOCUMENTS 9,037,396 B2 * 5/2015 Pack ....................... G01C 21/30
701/409
2009/0135183 A1 5/2009 Sato et al.
(Continued)

FOREIGN PATENT DOCUMENTS

AR 084952 A1 7/2013
AR 84952 A1 7/2013
(Continued)

OTHER PUBLICATIONS

Klein, et al., "Parallel Tracking and Mapping for Small AR Workspace", 6th IEEE and ACM International Symposium on Mixed and Augmented Reality, Dec. 2007, 10 pages.
(Continued)

*Primary Examiner* — Charlotte M Baker
(74) *Attorney, Agent, or Firm* — Chip Law Group

(57) ABSTRACT

A normal-line information generation block 30 generates normal-line information for a frame subject to detection. A data storage block 50 stores normal-line information and the like of a key frame. A motion amount detection block 40 detects a motion amount of an imaging position of the frame subject to detection relative to an imaging position of the key frame on the basis of the normal-line information of the key frame stored in the data storage block 50 and the normal-line information of the frame subject to detection generated by the normal-line information generation block 30. Even if a positional difference of a same point is small or a luminance difference occurs between a taken image of the key frame and a taken image of a current frame, a motion amount of the
(Continued)

imaging position of the frame subject to detection relative to the imaging position of the key frame can be accurately detected on the basis of normal-line information. Therefore, an observation position can be accurately detected.

17 Claims, 24 Drawing Sheets

(51) Int. Cl.
  *G06T 7/20* (2017.01)
  *G06T 7/73* (2017.01)
  *G06T 7/579* (2017.01)

(52) U.S. Cl.
  CPC .............. *G06T 2207/10028* (2013.01); *G06T 2207/30244* (2013.01)

(58) Field of Classification Search
  CPC .. A61B 6/5241; H04N 5/2254; H04N 5/2258; H04N 5/23216; H04N 13/128; G02B 7/36
  USPC ........ 382/107; 701/409; 356/3.1, 3.01, 4.01, 356/5.01, 3.14; 378/197; 250/201.6; 396/128
  See application file for complete search history.

(56) References Cited

U.S. PATENT DOCUMENTS

| | | | |
|---|---|---|---|
| 2010/0289878 | A1 | 11/2010 | Sato et al. |
| 2012/0194644 | A1 | 8/2012 | Newcombe et al. |

FOREIGN PATENT DOCUMENTS

| | | |
|---|---|---|
| CN | 101542232 A | 9/2009 |
| CN | 102047651 A | 5/2011 |
| CN | 102609942 A | 7/2012 |
| EP | 2071280 A1 | 6/2009 |
| EP | 2671384 A2 | 12/2013 |
| HK | 1171853 A1 | 7/2016 |
| JP | 2009-058533 A | 3/2009 |
| JP | 4317583 B2 | 8/2009 |
| JP | 4435867 B2 | 3/2010 |
| JP | 2014-511591 A | 5/2014 |
| JP | 5881743 B2 | 3/2016 |
| KR | 10-2014-0000315 A | 1/2014 |
| RU | 2009107141 A | 9/2010 |
| TW | 201234278 A | 8/2012 |
| WO | 2009/019886 A1 | 2/2009 |
| WO | 2009/147814 A1 | 12/2009 |
| WO | 2010/113240 A1 | 10/2010 |
| WO | 2012/106068 A2 | 8/2012 |

OTHER PUBLICATIONS

Newcombe, et al., "DTAM: Dense Tracking and Mapping in Real-Time", IEEE International Conference on Computer Vision (ICCV), 2011, 08 pages.

International Search Report and Written Opinion of PCT Application No. PCT/JP2016/056193, dated May 31, 2016, 09 pages of ISRWO.

Extended European Search Report of EP Patent Application No. 16792412.5, dated Nov. 19, 2018, 11 pages.

Molton, et al., "Locally Planar Patch Features for Real-Time Structure from Motion", 10 pages.

Hoover, et al., "Egomotion Estimation of a Range Camera Using the Space Envelope", IEEE Transactions on Systems, Man, and Cybernetics part B: Cybernetics, vol. 33, No. 4, Aug. 2003, 717-721 pages.

Wuest, et al., "Acquisition of High Quality Planar Patch Features", ISVC 2008, Part I, LNCS 5358, 530-539 pages.

Klein, et al., "Parallel Tracking and Mapping for Small AR Workspaces", Active Vision Laboratory Department of Engineering Science University of Oxford, 10 pages.

Newcombe, et al., "DTAM: Dense Tracking and Mapping in Real-Time", Department of Computing, Imperial College London, UK, 08 pages.

\* cited by examiner

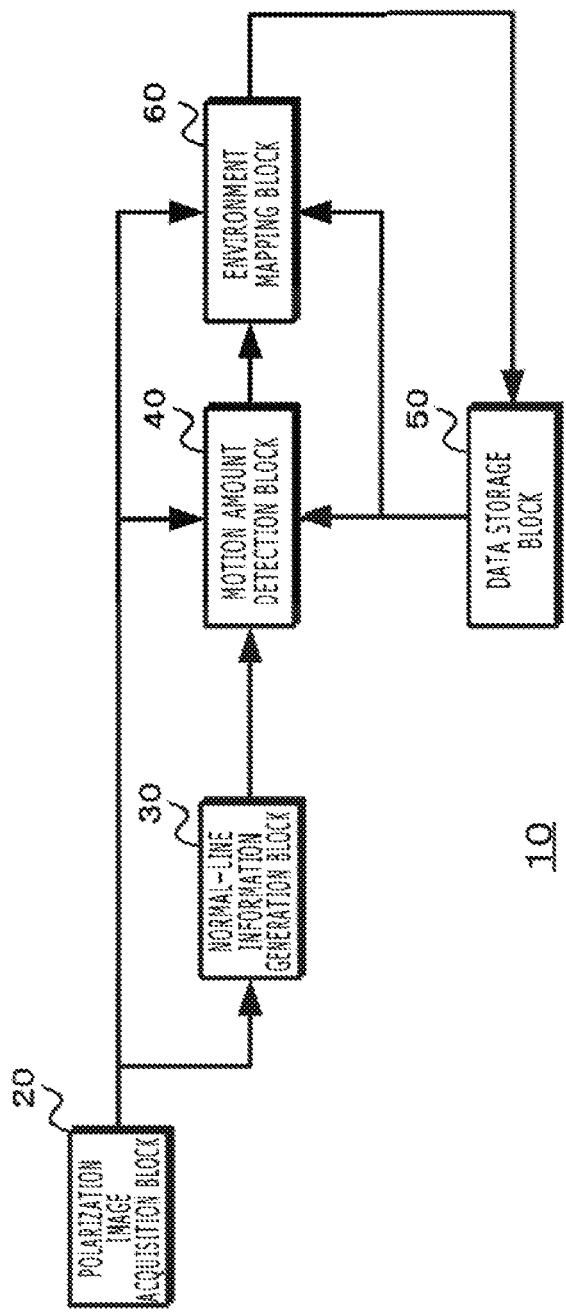

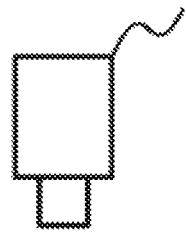
FIG. 10(a)
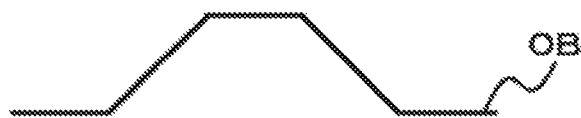
FIG. 10(b)
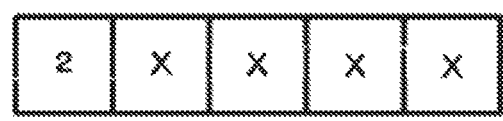
FIG. 10(c)
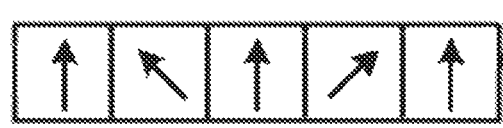
FIG. 10(d)
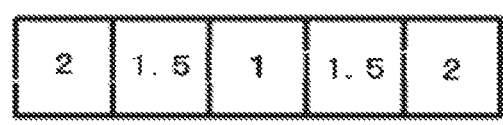

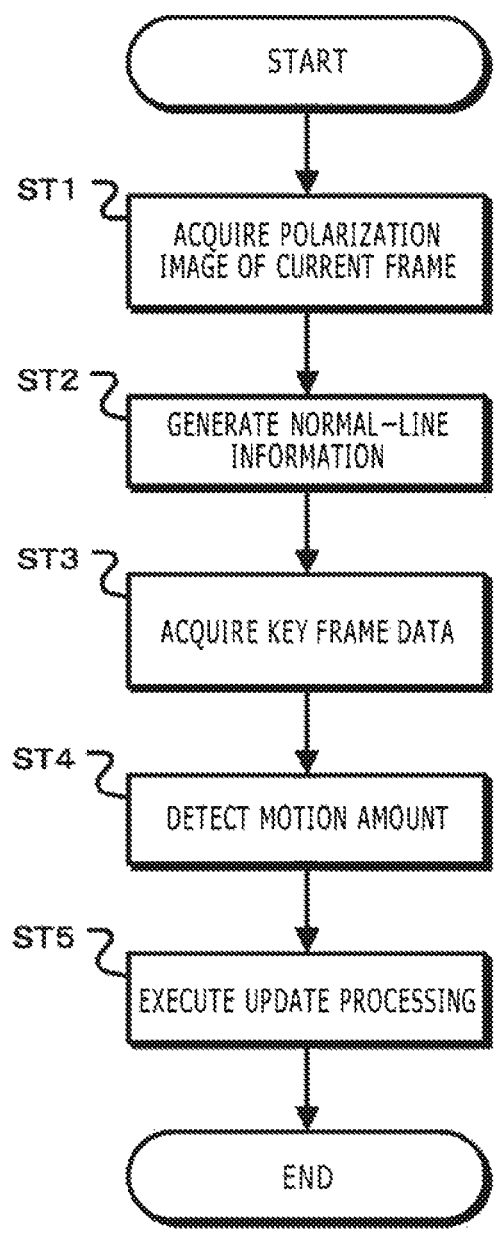

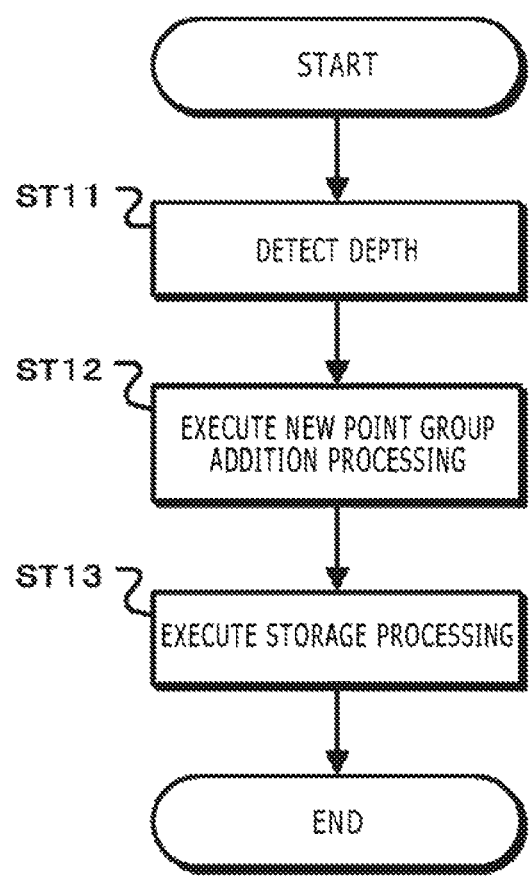

IMAGE PROCESSING APPARATUS AND IMAGE PROCESSING METHOD

CROSS REFERENCE TO RELATED APPLICATIONS

This application is a U.S. National Phase of International Patent Application No. PCT/JP2016/056193 filed on Mar. 1, 2016, which claims priority benefit of Japanese Patent Application No. JP 2015-099021 filed in the Japan Patent Office on May 14, 2015. Each of the above-referenced applications is hereby incorporated herein by reference in its entirety.

TECHNICAL FIELD

The present technology relates to an image processing apparatus, an image processing method, and a program and is intended to detect observation positions accurately.

BACKGROUND ART

Simultaneous localization and mapping (SLAM) capable of simultaneously executing self-localization estimate and environment mapping has been conventionally used in the areas of robotics and unattended operations. With SLAM, self-localization estimate and environment mapping are executed on the basis of feature points in NPL 1 below, for example. Further, in NPL 2, self-localization estimate and environment mapping are executed without use of feature points.

CITATION LIST

Non Patent Literature

[NPL 1]
Georg Klein and David Murray, "Parallel Tracking and Mapping for Small AR Workspaces," In Proc. International Symposium on Mixed and Augmented Reality (ISMAR'07, Nara)
[NPL 2]
Richard A. Newcombe, Steven J. Lovegrove and Andrew J. Davison, "DTAM: Dense Tracking and Mapping in Real-Time," IEEE International Conference on Computer Vision (ICCV 2011) Pages 2320-2327

SUMMARY

Technical Problems

Meanwhile, with the related-art SLAM, by use of an imaging apparatus having a general image sensor and on the basis of information about the luminance of a taken image and a pixel position therein, a rotational amount and a travel amount of the imaging apparatus are simultaneously estimated so as to create an environment map. Therefore, if a positional difference at a same point between a taken image of a key frame and a taken image of a current frame is small, for example, it is difficult to determine the motion amount of an imaging position (an observation position), namely, a rotational amount and a travel amount of the imaging apparatus. In addition, since the related-art SLAM presupposes that the luminance of a same point when viewed from different viewpoints remain unchanged, if a luminance difference occurs at a same point between a taken image of the key frame and a taken image of the current frame, an error is caused in the detection of a motion amount.

Therefore, it is an object of the present technology to provide an image processing apparatus, an image processing method, and a program that are capable of detecting observation positions with enhanced accuracy.

Solution to Problems

In carrying out the present technology and according to a first aspect thereof, there is provided an image processing apparatus. This image processing apparatus has a normal-line information generation block configured to generate normal-line information of a scene at an observation position and a self-localization estimation block configured to estimate the observation position on the basis of the normal-line information generated by the normal-line information generation block.

In this technology, two or more polarization images having different polarization directions in a frame subject to detection, for example, are acquired at an imaging position (an observation position) by a polarization image acquisition block and normal-line information is generated by the normal-line information generation block on the basis of the acquired two or more polarization images. In a motion amount detection block, a motion amount of an imaging position of the frame subject to detection relative to an imaging position of the key frame is detected on the basis of normal-line information of the key frame imaged at an imaging position (a reference position) different from the observation position stored in a data storage block or the like and the normal-line information of the frame subject to detection generated by the normal-line information generation block. The motion amount detection block resolves indefiniteness if the normal-line information generated by the normal-line information generation block has any and detects a motion amount by use of the normal-line information resolved with the indefiniteness.

For example, the motion amount detection block has a feature point detection block configured to detect a feature point from an image of the frame subject to detection, a feature point matching block configured to execute matching processing between the feature point detected by the feature point detection block and a feature point detected from an image of the key frame so as to detect a pair of feature points corresponding to each other between the key frame and the frame subject to detection, a rotational amount detection block configured to detect a rotational amount of an imaging position of the frame subject to detection relative to an imaging position of the key frame on the basis of normal-line information of each of the feature points of the key frame and the frame subject to detection that are detected by the feature point matching block, and a travel amount detection block configured to detect a travel amount of the imaging position of the frame subject to detection relative to the imaging position of the key frame on the basis of the rotational amount detected by the rotational amount detection block, the feature point detected by the feature point matching block, and a three-dimensional position of the feature point of the key frame or a two-dimensional position on an image.

Alternatively, the motion amount detection block has a feature point detection block configured to detect a feature point from an image of the frame subject to detection, a feature point matching block configured to execute matching processing between the feature point detected by the feature point detection block and a feature point detected from an image of the key frame so as to detect a pair of feature points corresponding to each other between the key frame and the frame subject to detection, and a rotational/travel amount detection block configured to detect a rotational and/or travel motion amount of an imaging position of the frame subject to detection relative to an imaging position of the key frame on the basis of normal-line information of each of the feature points of the key frame and the frame subject to detection that are detected by the feature point matching block and a three-dimensional position of the detected feature point of the key frame or a two-dimensional position on an image.

Alternatively, the motion amount detection block has a rotational/travel amount detection block configured to detect a rotational and/or travel motion amount of an imaging position of the frame subject to detection relative to an imaging position of the key frame on the basis of an image and normal-line information of the frame subject to detection and an image, normal-line information and a depth of the key frame.

Alternatively, the motion amount detection block has a feature point detection block configured to detect a feature point from a normal-line image based on normal-line information of the frame subject to detection generated by the normal-line information generation block, a feature point matching block configured to execute matching processing between the feature point detected by the feature point detection block and a feature point detected from an image of the key frame so as to detect a pair of feature points corresponding to each other between the key frame and the frame subject to detection, and a motion amount detection processing block configured to compute a motion amount of an imaging position of the frame subject to detection relative to an imaging position of the key frame on the basis of normal-line information of each of the feature points of the key frame and the frame subject to detection that are detected by the feature point matching block.

Further, the image processing apparatus further has an environment mapping block configured to compute a depth of the frame subject to detection on the basis of the motion amount detection result from the motion amount detection block and the depth of the key frame so as to add a three-dimensional point group based on the computed depth and the motion amount detection result to an environment map including a three-dimensional position and normal-line information of a three-dimensional point group, and a data storage block configured to store data of the key frame and the environment map.

In carrying out the present technology and according to a second aspect thereof, there is provided an image processing method. This image processing method includes generating, by a normal-line information generation block, normal-line information of a scene at an observation position, and estimating, by a self-localization estimation block, the observation position on the basis of the normal-line information generated by the normal-line information generation block.

In carrying out the present technology and according to a third aspect thereof, there is provided a program for making a computer execute a normal-line information generation procedure for generating normal-line information of a scene at an observation position, and a self-localization estimation procedure for estimating the observation position on the basis of the normal-line information generated by the normal-line information generation procedure.

It should be noted that the program according to the present technology is a program that can be provided to, for example, a general-purpose computer capable of executing various program codes through storage media or communication media for providing the program in a computer-readable format, namely, storage media such as an optical disc, a magnetic disc, or a semiconductor memory or communication media such as a network, for example. Providing such a program in a computer-readable format realizes the processing in accordance with the program on the computer.

Advantageous Effects of Invention

According to the present technology, normal-line information of a scene at an observation position is generated and, on the basis of the generated normal-line information, the observation position is estimated. For example, on the basis of normal-line information of a scene corresponding to a frame subject to detection imaged at the observation position and normal-line information of a scene corresponding to a key frame imaged at a reference position that differs from the observation position, a motion amount of an imaging position of the frame subject to detection relative to an imaging position of the key frame is accurately detected so as to estimate the observation position. That is, the observation position can be accurately detected. It should be noted that the effects described herein are illustrative only and therefore not limited thereto. There may be additional effects other than those described herein.

BRIEF DESCRIPTION OF DRAWINGS

FIG. 2 is a diagram indicative of a configuration of a first embodiment.

FIGS. 10(a), 10(b), 10(c) and 10(d) are diagrams describing generation processing of a high-density depth map.

FIG. 11 is a flowchart indicative of an operation in the first embodiment.

FIG. 12 is a flowchart indicative of update processing that is executed in an environment mapping block.

DESCRIPTION OF EMBODIMENTS

Figure 1:
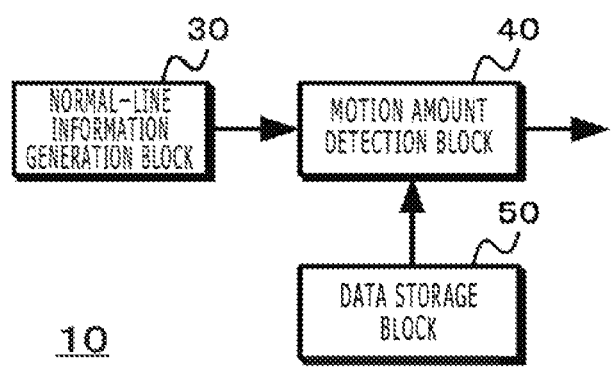
FIG. 1 is a diagram indicative of a configuration of an image processing apparatus.

The following describes embodiments of the present technology. It should be noted that the description will be done in the following sequence.
1. Configuration of Image Processing Apparatus
2. First Embodiment
3. First Example in First Embodiment
4. Second Example in First Embodiment
5. Third Example in First Embodiment
6. Second Embodiment
7. Other Embodiments 1. Configuration of Image Processing Apparatus FIG. 1 depicts a configuration of an image processing apparatus. The image processing apparatus 10 has a normal-line information generation block 30 and a motion amount detection block 40. The normal-line information generation block 30 generates normal-line information of a scene at an observation position, for example, a scene corresponding to a frame subject to detection (hereafter simply referred to as "frame subject to detection"). On the basis of the normal-line information of a scene at a reference position different from an observation position stored in a data storage block 50 or the like, for example, a scene corresponding to a key frame imaged at a reference position different from an observation position (hereafter simply referred to as "key frame"), and the normal-line information of a frame subject to detection generated by the normal-line information generation block 30, the motion amount detection block 40 detects a motion amount of an imaging position of the frame subject to detection relative to an imaging position of the key frame. That is, the motion amount detection block 40 detects an amount of change in the position or attitude of an imaging block that generates an image of the frame subject to detection from an imaging position of the imaging block that generates a key frame image. In addition, by detecting a motion amount of the imaging position of the frame subject to detection relative to the imaging position of the key frame, the position and attitude at the time of the generation of an image of the frame subject to detection with reference to the position and attitude at the time of the generation of the key frame image can be detected. Thus, the image processing apparatus detects an observation position at the time of the generation of a frame image on the basis of the normal-line information generated by the normal-line information generation block.

The following describes, in the first embodiment, the case in which the generation of normal-line information and the detection of motion amount by use of polarization images are executed. Further, in the second embodiment, the following describes the case in which the detection of motion amount is executed on the basis of normal-line information without use of polarization images.

2. First Embodiment

FIG. 2 depicts a configuration of the first embodiment. The image processing apparatus 10 has the normal-line information generation block 30 and the motion amount detection block 40. In addition, the image processing apparatus 10 may have a polarization image acquisition block 20, a data storage block 50, and an environment mapping block 60. The following describes the case in which the polarization image acquisition block 20, the data storage block 50, and the environment mapping block 60 are also arranged.

The polarization image acquisition block 20 acquires a polarization image of a frame subject to detection. The polarization image acquisition block 20 acquires two or more polarization images having different polarization direction; polarization images having three or more polarization directions, for example. The polarization image acquisition block 20 may have a configuration in which an imaging block that generates polarization images having three or more polarization directions is arranged or a configuration in which polarization images having three or more polarization directions are acquired from an external device, a recording medium or the like. The polarization image acquisition block 20 uses a current frame polarization image generated by an imaging block as a polarization image of the frame subject to detection, for example. In what follows, a polarization image of the frame subject to detection is described as a current frame polarization image.

Figure 3A:
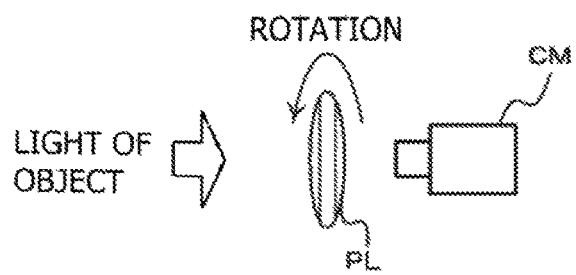
FIGS. 3(a), 3(b), 3(c) and 3(d) depict diagrams describing a polarization image acquired by a polarization image acquisition block.
Figure 3B:
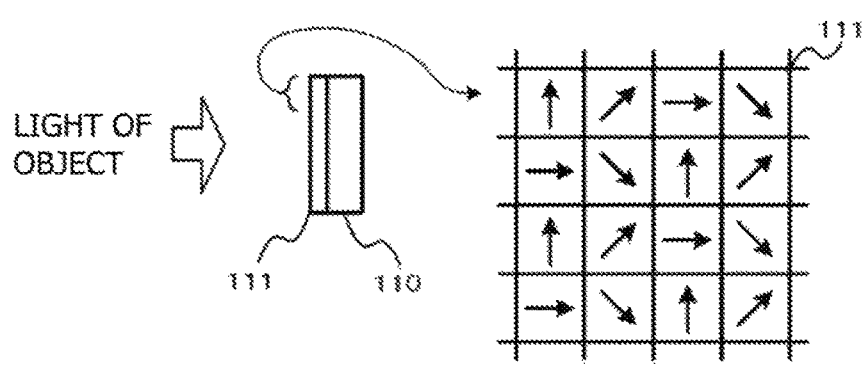
Figure 3C:
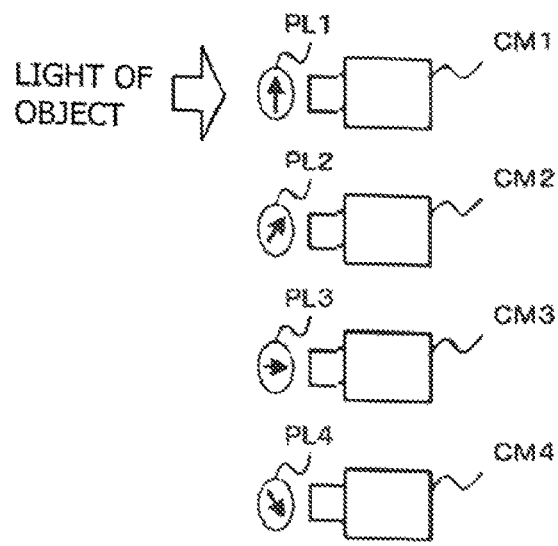
Figure 3D:
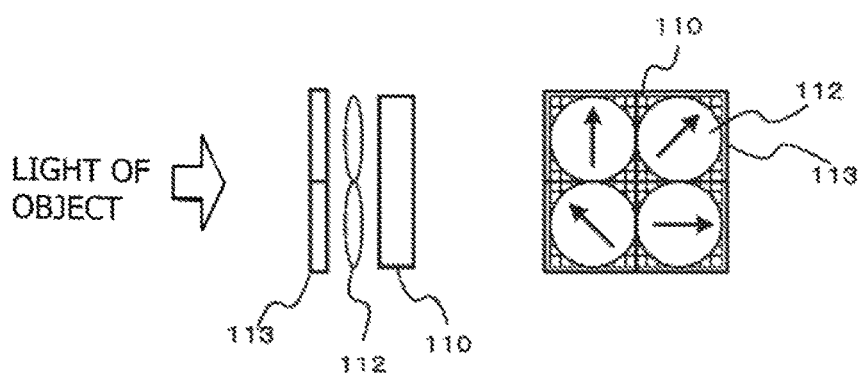

FIGS. 3(a), 3(b), 3(c) and 3(d) depict a diagram describing a polarization image that is acquired by the polarization image acquisition block. As depicted in FIG. 3(a), for example, a polarization image is generated by rotating a polarization plate PL arranged in front of an imaging block CM so as to image an object in each of three or more polarization directions. In addition, as depicted in FIG. 3(b), a polarization image may be generated by imaging an object after arranging a polarization filter 111 on an image sensor 110, the polarization filter 111 having a pixel configuration of three or more polarization directions. It should be noted that, in FIG. 3(b), the case in which the polarization filter 111 in which each pixel becomes a pixel having any one of four different types of polarization directions (indicated by arrow marks) is arranged on the front face of the image sensor 110 is illustrated, for example. In addition, as depicted in FIG. 3(c), a polarization image may be generated by sequentially imaging an object by imaging blocks CM1 through CM4 from a same position after arranging polarization plates PL1 through PL4 having different polarization directions in front of the imaging blocks CM1 through CM4. Further, as depicted in FIG. 3(d), two or more polarization images having different polarization directions may be generated by use of a multi-lens array configuration. For example, by arranging two or more lenses 112 (four in the diagram) in front of the image sensor 110, an optical image of an object is focused on the imaging surface of the image sensor 110 through each lens 112. In addition, by arranging polarization plates 113 in front of the respective lenses 112, the polarization directions of the polarization plates 113 are made different from each other. This configuration can generate polarization images having different polarization directions by use of the image sensor 110.

Further, if no color filter is used by the imaging block, then the polarization image acquisition block 20 can acquire a luminance polarization image. In the cases of FIG. 3(a) and FIG. 3(c), an image equivalent to an ordinary luminance image that is not polarized can be acquired by averaging the luminance levels of luminance polarization images having different polarization directions for each pixel. Still further, in the case of FIG. 3(b), an image equivalent to an ordinary luminance image having no polarization can be acquired by averaging the luminance levels of the four pixels adjacent to each other with different polarization directions. Yet further, in the case of FIG. 3(d), if the distance between the lenses 112 relative to the distance to an object is short enough to be ignored, the parallax may be ignored with two or more polarization images having different polarization directions. Therefore, averaging the luminance levels of polarization images having different polarization directions allows the acquisition of an image equivalent to an ordinary luminance image having no polarization. If the parallax cannot be ignored, an image equivalent to an ordinary luminance image having no polarization can be acquired by aligning the polarization images having different polarization directions in accordance with an amount of parallax and averaging the luminance levels of the aligned polarization images. Further, the polarization image acquisition block 20 may generate not only luminance polarization images but also three-primary-color images at the same time by arranging color filters in the imaging block or generate infrared images or the like at the same time.

Figure 4:
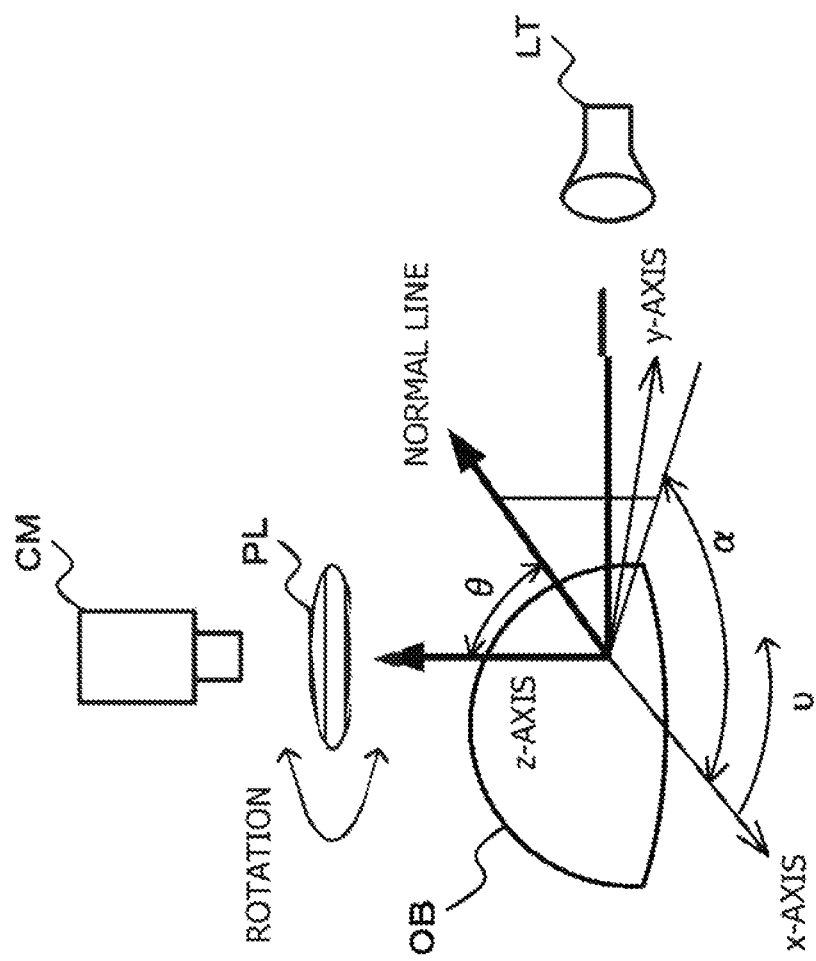
FIG. 4 is a diagram describing the shape of an object and a polarization image thereof.

The normal-line information generation block 30 generates normal-line information from two or more polarization images having different polarization directions acquired by the polarization image acquisition block 20. The following describes the shape of an object and a polarization image thereof with reference to FIG. 4. As depicted in FIG. 4, for example, an object OB is illuminated by use of a light source LT and an imaging block CM images the object OB through a polarization plate PL. In this case, with a taken image, the luminance of the object OB varies in accordance with polarization directions of the polarization plate PL. It should be noted that, for the ease of description, it is assumed that two or more polarization images be acquired by rotating the polarization plate PL so as to perform imaging, the highest luminance being Imax and the lowest luminance being Imin, for example. It is also assumed that, if the x-axis and the y-axis in a two-dimensional coordinate are on the plane of the polarization plate PL, the angle in the y-axis direction relative to the x-axis when the polarization plate PL is rotated be polarization angle ν.

Figure 5:
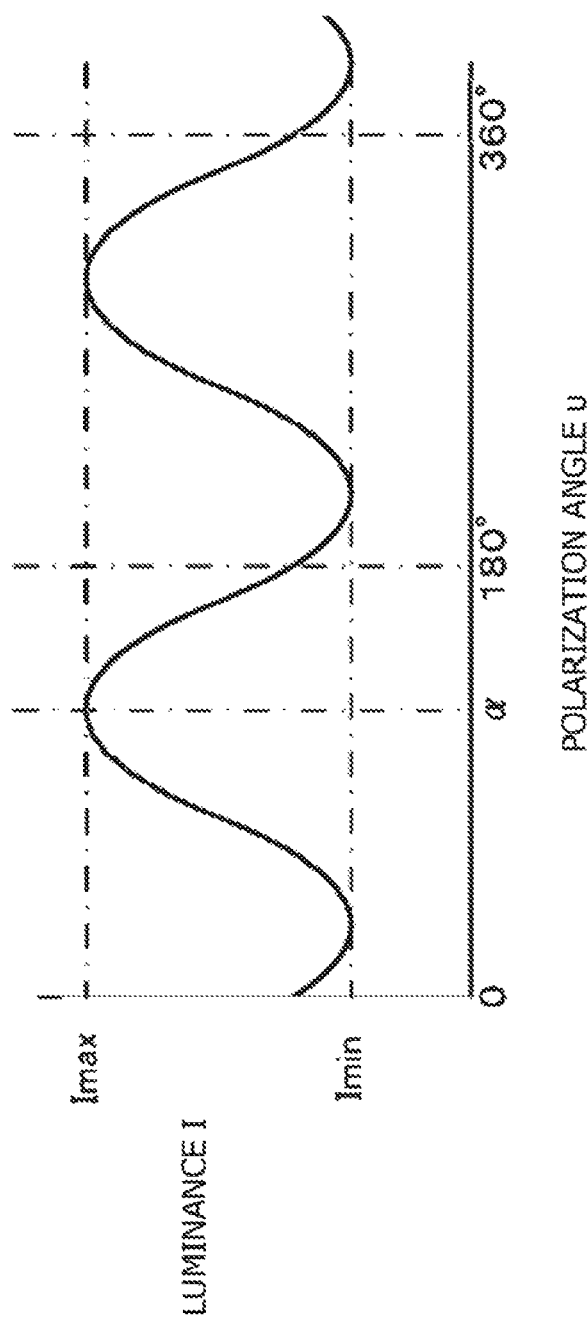
FIG. 5 is a diagram illustrating a relation between luminance and a polarization angle.

The polarization plate PL returns to the original polarization state when rotated by 180 degrees and has a cycle of 180 degrees. Further, let polarization angle ν when the maximum luminance Imax has been observed be azimuth angle α. According to such definition as described above, luminance I that is observed when the polarization plate PL is rotated is expressed as equation (1) below. It should be noted that FIG. 5 depicts an example of a relation between luminance and polarization angle. Further, this example depicts a model of diffuse reflection; in the case of specular reflection, the azimuth angle is offset by 90 degrees relative to the polarization angle.

[Math. 1]

$$I = \frac{I_{max} + I_{min}}{2} + \frac{I_{max} - I_{min}}{2}\cos(2\nu - 2\alpha) \quad (1)$$

With equation (1), polarization angle ν is apparent at the time of the generation of a polarization image, maximum luminance Imax, minimum luminance Imin, and azimuth angle α being variables. Therefore, executing the fitting into the model expression indicated in equation (1) by use of the luminance of polarization images having three or more polarization directions allows the decision of azimuth angle α that is a polarization angle providing the maximum luminance on the basis of the model expression indicative of the relation between luminance and polarization angle.

It is also assumed that the normal line of the surface of an object be expressed by a polar coordinate system, the normal line being the azimuth angle α and the zenith angle θ. It should be noted that the zenith angle θ be an angle toward the normal line from the z-axis and the azimuth angle α be an angle in the y-axis direction relative to the x-axis as described above. Here, if the minimum luminance Imin and the maximum luminance Imax are obtained when the polarization plate PL is rotated, then polarization degree ρ can be computed on the basis of equation (2) below.

[Math. 2]

$$\rho = \frac{I_{max} - I_{min}}{I_{max} + I_{min}} \quad (2)$$

Figure 6:
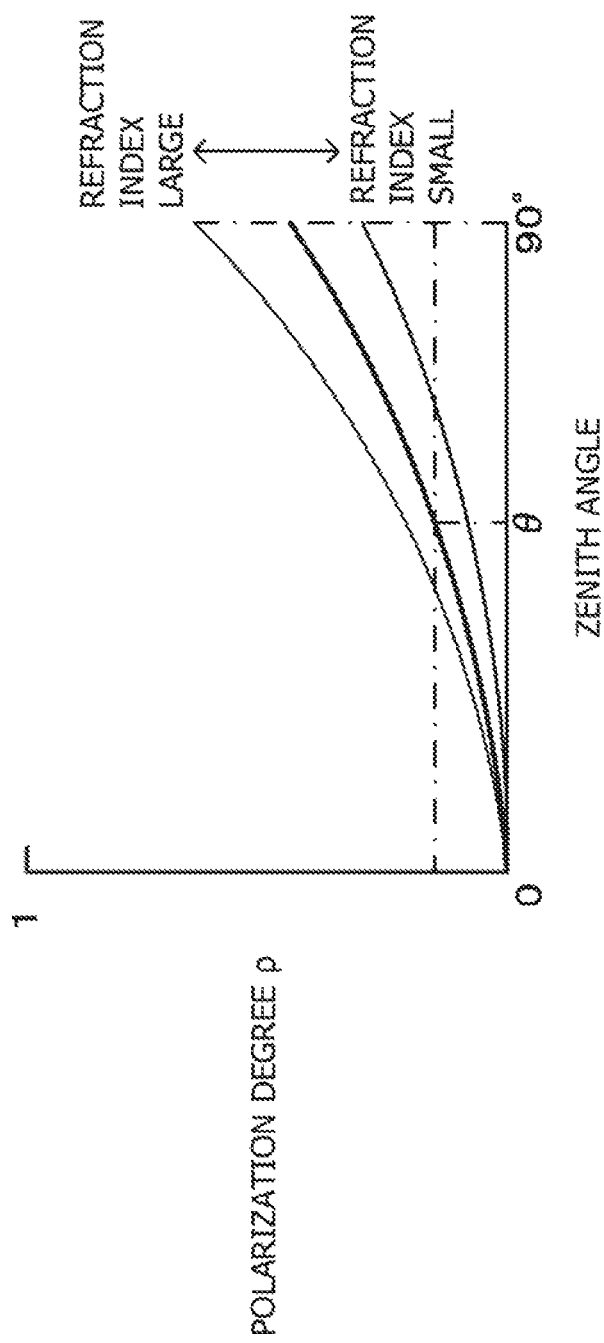
FIG. 6 is a diagram indicative of a relation between the degree of polarization and a zenith angle.

The relation between the polarization degree and the zenith angle is known to have a characteristic depicted in FIG. 6, for example, from Fresnel formula in the case of diffuse reflection. Therefore, from the characteristic depicted in FIG. 6, the zenith angle θ can be decided on the basis of the polarization degree ρ. It should be noted that the characteristic depicted in FIG. 6 is illustrative only and therefore varies in accordance with the refractive index and the like of an object. For example, as the refractive index increases, the polarization degree increases.

The normal-line information generation block 30 computes the azimuth angle α and the zenith angle θ as described above and generates normal-line information indicative of the computed azimuth angle α and zenith angle θ. It should be noted that the normal-line information indicative of the azimuth angle α and the zenith angle θ provides a normal-line angle.

Figure 7A:
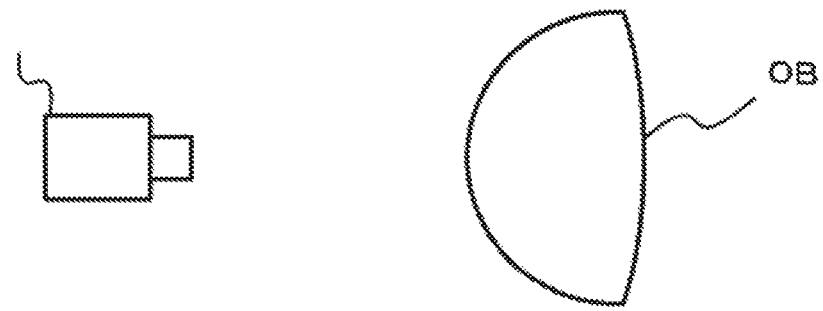
FIGS. 7(a), 7(b) and 7(c) are diagrams describing indefiniteness of 180 degrees.
Figure 7B:
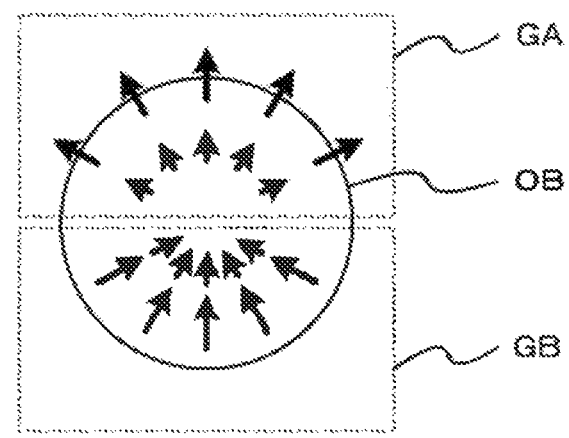
Figure 7C:
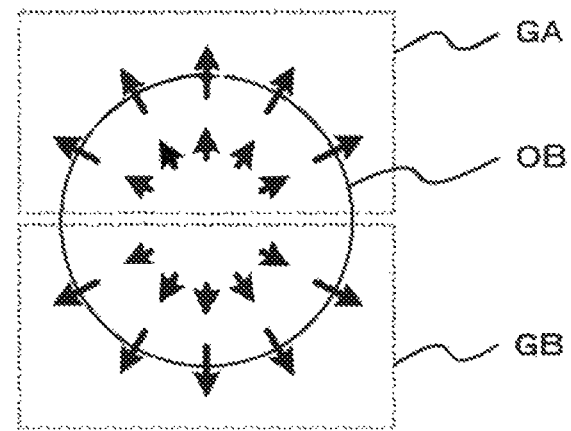

The normal-line information generated by the normal-line information generation block 30 as described above has indefiniteness of 180 degrees. FIGS. 7(a), 7(b) and 7(c) depicts a diagram describing the indefiniteness of 180 degrees. In the case where an object OB depicted in FIG. 7(a) is imaged by an imaging block CM so as to compute a normal line, a luminance variation in accordance with the rotation in polarization direction has a cycle of 180 degrees. Therefore, in a region GA that is the upper half of the object OB, as depicted in FIG. 7(a), for example, the normal-line direction (indicated by arrow marks) provides the correct direction; in a region GB that is the lower half, there is a possibility that the normal-line direction be reversed.

The motion amount detection block 40 uses a phenomenon that the normal-line direction of a same object as observed from different viewpoints depends only on the variation in the rotational amount of an imaging block so as to detect from the variation in the normal-line direction a rotational amount of the imaging block, namely, a rotational amount of an imaging position of a current frame relative to a key frame. To be more specific, on the basis of the normal-line information generated from the acquired current frame polarization image and the data stored in the data storage block 50, the motion amount detection block 40 detects a rotational amount of an imaging position of the current frame polarization image relative to an imaging position of a key frame polarization image. It should be noted that the rotation of the imaging block denotes, if an optical axis is the z-axis, a motion around a rotation axis that is at least one of the z-axis, the x-axis orthogonal to the z-axis, and the y-axis orthogonal to the z-axis and the x-axis. Further, a motion in at least one of the axis directions of the x-axis, the y-axis, and the z-axis is a travel of the imaging block.

Figure 8:
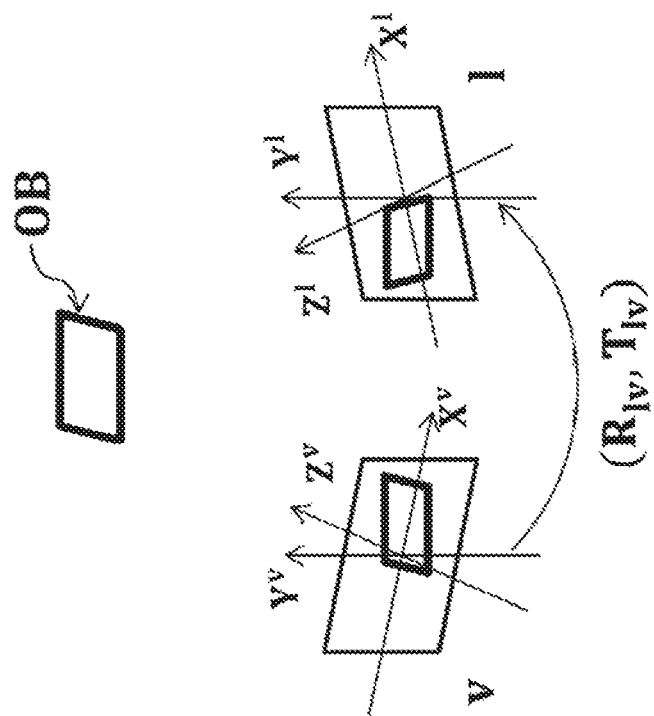
FIG. 8 is a diagram describing a difference in normal-line information when observing a same object from different viewpoints.

FIG. 8 depicts a diagram describing the difference in the normal-line information obtained when a same object has been observed from different viewpoints. The normal line of an object OB obtained with a key frame v provides a camera coordinate system of a viewpoint of the key frame, namely, a coordinate system with an optical axis of viewpoint V of the key frame being $Z^v$-axis, a right direction of an image surface perpendicular to the optical axis of the key frame being $X^v$-axis, and an upward direction perpendicular to the $X^v$-axis relative to the image surface being $Y^v$-axis. Likewise, the normal line of the object OB obtained with a current frame l provides a camera coordinate system of a viewpoint of the current frame, namely, a coordinate system with an optical axis of a viewpoint of the current frame being $Z^l$-axis, a right direction of an image surface perpendicular to the optical axis of the current frame being $X^l$-axis, and an upward direction perpendicular to the $X^l$-axis relative to the image surface being $Y^l$-axis. That is, the normal-line direction of the observed object OB is a direction to the camera coordinate system of the viewpoint being observed. For example, let viewpoint variations of the current frame l relative to the key frame v be rotational amount $R_{lv}$ and travel amount $T_{lv}$, then, if the normal line of one point of the object is $N^v$ in the coordinate system of the key frame, normal line $N^l$ of the same point of the object in the coordinate system of the current frame can be computed on the basis of equation (3) below.

[Math. 3]

$$N^l = R_{lv}^{-1} N^v \quad (3)$$

Further, the normal-line information generated from a polarization image has indefiniteness of 180 degrees as described above. Hence, in the motion amount detection block 40, the indefiniteness of the normal-line information is resolved. If a point of an object corresponding to the key frame is in the current frame, for example, the motion amount detection block 40 resolves the indefiniteness of the normal line of the point in the object of the current frame by use of the normal line of the point in the object of the key frame. It should be noted that, if, at the start of SLAM, the normal-line information of the key frame has indefiniteness and the depth of the key frame is not known, the indefiniteness of the normal-line information is resolved by use of a statistical method or the like that will be described later.

On the basis of a result of motion amount detection obtained by the motion amount detection block 40, the environment mapping block 60 generates a depth corresponding to the current frame polarization image. In addition, if the depth of the key frame has not been acquired, the environment mapping block 60 obtains the depth of the key frame and the depth of the current frame by use of a method such as stereo matching by use of a result of motion amount detection by the motion amount detection block 40 and the images of the current frame and the key frame.

Figure 9:
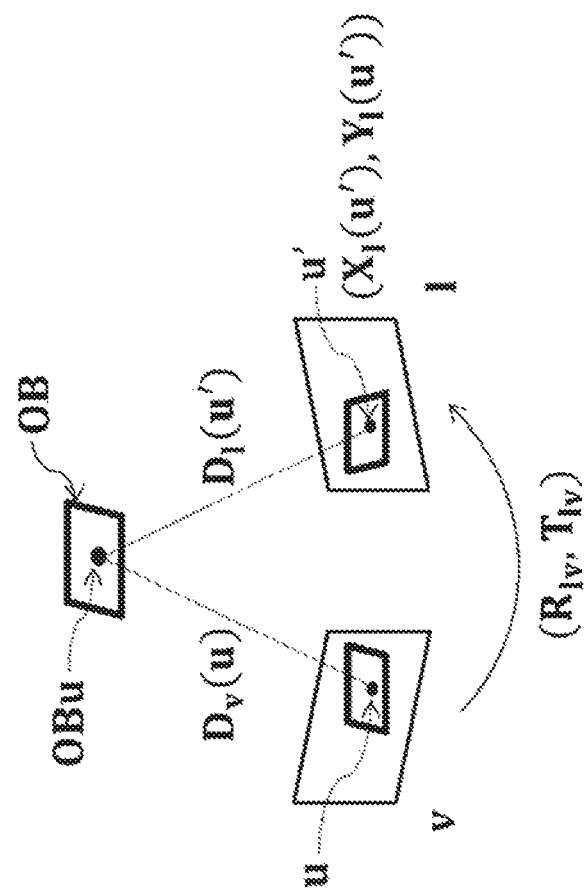
FIG. 9 is a diagram describing computation of the depth of a current frame.

If the depth of the key frame has been acquired, the depth of the current frame can be obtained by re-projecting to the current frame a three-dimensional position to which the depth of the key frame corresponds on the basis of an imaging position of the current frame polarization image relative to an imaging position of the key frame polarization image. Equation (4) is indicative of a computation expression of the depth of the current frame. FIG. 9 depicts a diagram describing the computation of the depth of the current frame. In equation (4), $D_v(u)$ is indicative of a depth of a pixel position u (a pixel position indicative of an object position OBu) in the key frame and $D_l(u)$ is indicative of a depth of a pixel position u' (a pixel position indicative of an object position OBu) in the current frame. $[X_l(u') \; Y_l(u') \; D_l(u')]$ is indicative of three-dimensional coordinates of the pixel position u' in the camera coordinate system of the current frame. $\pi$ is indicative of a function for projecting a three-dimensional position (x, y, z) to (x/z, y/z). $\pi^{-1}(u, D_v(u))$ is indicative of a function for returning the pixel position u to the camera space if the pixel position u is depth $D_v(u)$, and K is indicative of an internal parameter matrix of the camera, indicating information related with focus distance, etc. $G_{lv}(\psi)$ is indicative of a motion amount (rotational amount $R_{lv}$ and travel amount $T_{lv}$) from the key frame to the current frame as indicated in equation (5).

[Math. 4]

$$[X_1(u') \; Y_1(u') \; D_1(u')]^T = K G_{lv}(\psi) \pi^{-1}(u, D_v(u)) \quad (4)$$

$$G_{lv}(\psi) = G(R_{lv}, T_{lv}) = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix} \quad (5)$$

Meanwhile, in the case where depths are computed by use of a method such as stereo matching, a pixel for which no depth has been obtained may be caused in an image region having no texture, for example; if this happens, a depth map indicative of a relation between pixel position and depth becomes a map of low density. Therefore, on the basis of the depth obtained by the processing described above and the normal-line information resolved with the indefiniteness obtained by the motion amount detection block 40, the environment mapping block 60 computes a depth for each pixel so as to generate a depth map of high density.

FIGS. 10(*a*), 10(*b*), 10(*c*) and 10(*d*) are diagrams for describing the processing of generating a high-density depth map. It should be noted that, for the ease of description, the processing of one line, for example, will be described. Assume that, from a polarization image of the object OB generated by the imaging block CM as depicted in FIG. 10(*a*), a depth depicted in FIG. 10(*b*) be obtained by the environment mapping block 60 and the normal-line information resolved with the indefiniteness by the motion amount detection block 40 as depicted in FIG. 10(*c*) be obtained. Also assume that the depth obtained from the polarization image be low in density; for example, a depth value for the left-end pixel is "2 (meters)" and no depth value has been obtained for other pixels indicated by. On the basis of the normal-line information, the environment mapping block 60 estimates a surface shape of the object OB. Here, the pixel that is the second from the left end can be decided, on the basis of the normal-line information of this pixel, that this pixel is equivalent to a slope surface approaching the direction of the imaging block from the object surface corresponding to the left-end pixel. Therefore, the environment mapping block 60 follows the surface shape of the object OB starting from the left-end pixel as the origin so as to estimate a depth value of the second pixel from the left end, obtaining value "1.5 (meter)," for example. Further, the third pixel from the left end can be decided to be equivalent to a surface opposite to the imaging block on the basis of the normal-line direction of this pixel. Therefore, the environment mapping block 60 follows the surface shape of the object OB starting from the left-end pixel as the origin so as to estimate a depth value of the third pixel from the left end, obtaining value "1 (meter)," for example. The fourth pixel from the left end can be decided to be equivalent to a slope surface in the direction moving away from the imaging block from the object surface corresponding to the third pixel from the left end. Therefore, the environment mapping block 60 follows the surface shape of the object OB starting from the left-end pixel as the origin so as to estimate a depth value of the fourth pixel from the left end, obtaining value "1.5 (meter)," for example. In addition, the environment mapping block 60 estimates a depth value of the fifth pixel from the left end in the same manner, obtaining "2 (meters)," for example. Thus the environment mapping block 60 generates the depth of high density depicted in FIG. 10(*d*) from the depth of low density depicted in FIG. 10(*b*) by use of the normal-line information resolved with the indefiniteness generated by the motion amount detection block 40.

Using the generated depth, the environment mapping block 60 updates an environment map stored in the data storage block 50. The environment map is information in which three-dimensional point groups are put in a database and is indicative of coordinate positions (three-dimensional positions) of points in the world coordinate system and indicative of normal-line information. On the basis of the generated high-density depth of the current frame and a result of the detection of motion amount obtained by the motion amount detection block 40, the environment mapping block 60 transforms the camera coordinate system of each point with a depth obtained into the world coordinate system. That is, the environment mapping block 60 estimates an observation position in the world coordinate system. Further, the environment mapping block 60 adds the coordinate position of each point in the transformed world coordinate system and the normal-line information to the environment map. It should be noted that the world coordinate system is assumed to be the camera coordinate system of the key frame at the time of the start of SLAM, for example. Therefore, by sequentially acquiring polarization images by the polarization image acquisition block 20 and executing the processing mentioned above by the normal-line information generation block 30 and the motion amount detection block 40, the information indicative of the surface shapes of objects included in the polarization images is sequentially stored in the environment map. It should be noted that the environment map may include not only the three-dimensional position and normal-line information of an object but also color information and the like of each point indicated by a three-dimensional position.

In addition, the environment mapping block 60 updates the key frame polarization image stored in the data storage block 50 by use of the current frame polarization image, thereby providing the current frame polarization image as a new key frame polarization image.

FIG. 11 is a flowchart indicative of an operation of the first embodiment. In step ST1, the image processing apparatus acquires a current frame polarization image. The polarization image acquisition block 20 of the image processing apparatus 10 acquires two or more polarization images having different polarization directions in the current frame and goes to step ST2.

In step ST2, the image processing apparatus generates normal-line information. By use of the luminance of two or more polarization images having different polarization directions, the normal-line information generation block 30 of the image processing apparatus 10 executes fitting and the like on a model expression so as to generate the normal-line information of the current frame, going to step ST3.

In step ST3, the image processing apparatus acquires data of the key frame. The motion amount detection block 40 of the image processing apparatus 10 acquires the data of the key frame stored in the data storage block 50 and then goes to step ST4.

In step ST4, the image processing apparatus detects a motion amount. On the basis of the normal-line information generated in step ST2 and the data of the key frame acquired in step ST3, the motion amount detection block 40 of the image processing apparatus 10 detects the imaging position of the current frame polarization image relative to the imaging position of the key frame polarization image and then goes to step ST5.

In step ST5, the image processing apparatus executes update processing. The environment mapping block 60 of the image processing apparatus 10 updates the environment map and the key frame.

FIG. 12 illustrates the update processing executed by the environment mapping block. In step ST11, the environment mapping block 60 detects a depth. The environment mapping block 60 detects the depth of the current frame and then goes to step ST12. It should be noted that, if the depth of the key frame has not been detected, the environment mapping block 60 also detects the depth of the key frame.

In step ST12, the environment mapping block 60 adds a new point group. The environment mapping block 60 adds a new point group with the depth detected in step ST11 to the environment map and then goes to step ST13.

In step ST13, the environment mapping block 60 executes storage processing. The environment mapping block 60 stores the environment map with the new point group added in step ST12 into the data storage block 50, thereby updating the environment map stored in the data storage block 50.

In addition, the environment mapping block 60 updates the key frame polarization image stored in the data storage block 50 by use of the current frame polarization image.

According to the first embodiment described above, a motion amount of the imaging position of the current frame relative to the imaging position of key frame can be detected by use of the normal-line information. Further, if a motion amount is detected on the basis of the luminance of a taken image and the information of a pixel position in the taken image as with the related-art SLAM, it is difficult to detect the motion amount if a positional difference of the same point in the taken image of the key frame and the taken image of the current frame is small. Also, with the related-art SLAM, it is presupposed that the luminance of the same point as viewed from different viewpoints be not changed, so that an error is caused in a detection result if the luminance changes. However, with the first embodiment, a motion amount is detected by use of normal-line information, so that, even with a small positional difference of the same point, a motion amount can be accurately detected if the normal-line direction changes. In addition, with the first embodiment, a motion amount is detected by use of normal-line information, so that, even if the luminance of the same point varies due to motion, a motion amount can be accurately detected.

Further, with the related-art SLAM, an environment map of high density is generated by smoothing the depth by use of the information about luminance variation. However, smoothing the depth with the information about luminance variation may eliminate minute shape variations, thereby causing a depth distortion. By contrast, since the normal-line information includes minute shape variations, the first embodiment allows more accurate detection of environment shapes, thereby creating an environment map near a true value.

3. First Example in First Embodiment

In the first example in the first embodiment, a case is described in which, on the basis of the normal-line information and the like of the respective feature points corresponding to each other between a key frame and a current frame, a rotational amount and a travel amount of an imaging position of the current frame relative to an imaging position of the key frame are sequentially detected.

Figure 13:
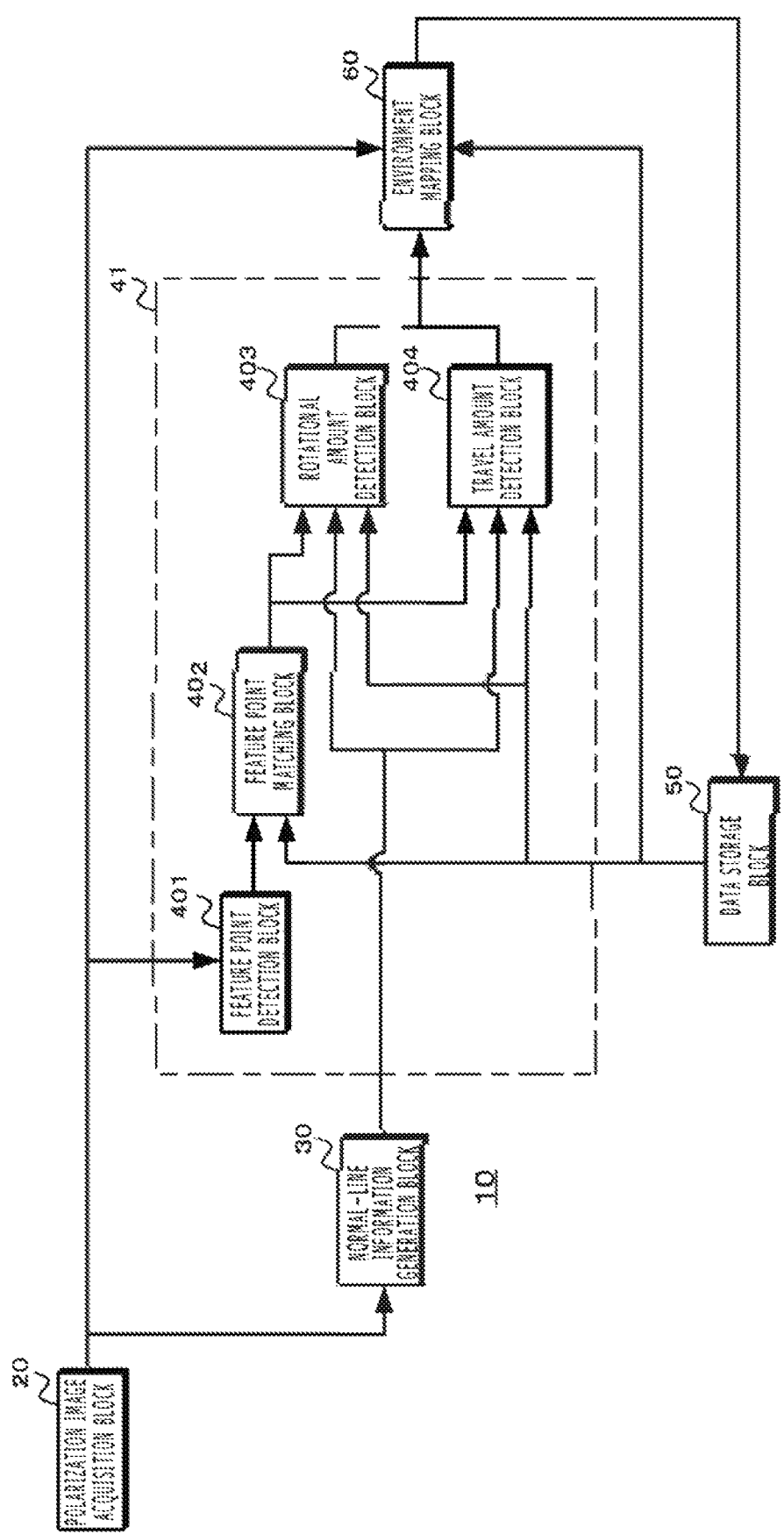
FIG. 13 is a diagram indicative of a configuration of a first example in the first embodiment.

FIG. 13 depicts a configuration of the first example in the first embodiment. An image processing apparatus of the first example has a polarization image acquisition block 20, a normal-line information generation block 30, a motion amount detection block 41, a data storage block 50, and an environment mapping block 60.

The polarization image acquisition block 20 acquires a current frame polarization image. The polarization image acquisition block 20 acquires two or more polarization images having different polarization directions; polarization images having three or more polarization directions, for example. The normal-line information generation block 30 generates normal-line information from the two or more polarization images having different polarization directions acquired by the polarization image acquisition block 20. The data storage block 50 stores data of the key frame, an environment map, and so on. The environment mapping block 60 generates a depth corresponding to the current-frame polarization image and executes processing of updating the environment map by use of the generated depth, for example.

On the basis of a variation in the normal-line direction of a same object imaged from different viewpoints, the motion amount detection block 41 sequentially detects a rotational amount and a travel amount from an imaging position at which an image of the key frame has been generated to an imaging position at which an image of the current frame has been generated. The motion amount detection block 41 has a feature point detection block 401, a feature point matching block 402, a rotational amount detection block 403, and a travel amount detection block 404.

The feature point detection block 401 detects a feature point from a polarization image acquired by the polarization image acquisition block 20. By use of the polarization image of the current frame acquired by the polarization image acquisition block 20, the feature point detection block 401 performs averaging of pixel values of two or more polarization images or other processing for each pixel of the polarization images for each pixel position so as to generate a non-polarization image equivalent to an image taken without use of a polarization plate, a polarization filter or the like. In addition, the feature point detection block 401 detects a feature point of a predetermined type from the non-polarization image by use of such a method as Scale-Invariant Feature Transform (SIFT), Speeded-Up Robust Features (SURF), or Features from Accelerated Segment Test (FAST).

The feature point matching block 402 executes matching processing on the feature point of the key frame stored in the data storage block 50 and the feature point detected by the feature point detection block 401. The feature point matching block 402 executes feature point matching processing by use of such a method as sum of absolute differences (SAD) or normalized cross correlation (NCC), for example, thereby detecting a pair of feature points corresponding to each other between the key frame and the current frame.

The rotational amount detection block 403 detects a rotational amount on the basis of the normal-line information having indefiniteness generated by the normal-line information generation block 30, the pair of feature points obtained by the feature point matching block 402, and the normal-line information of the feature point of the key frame stored in the data storage block 50.

Figure 14:
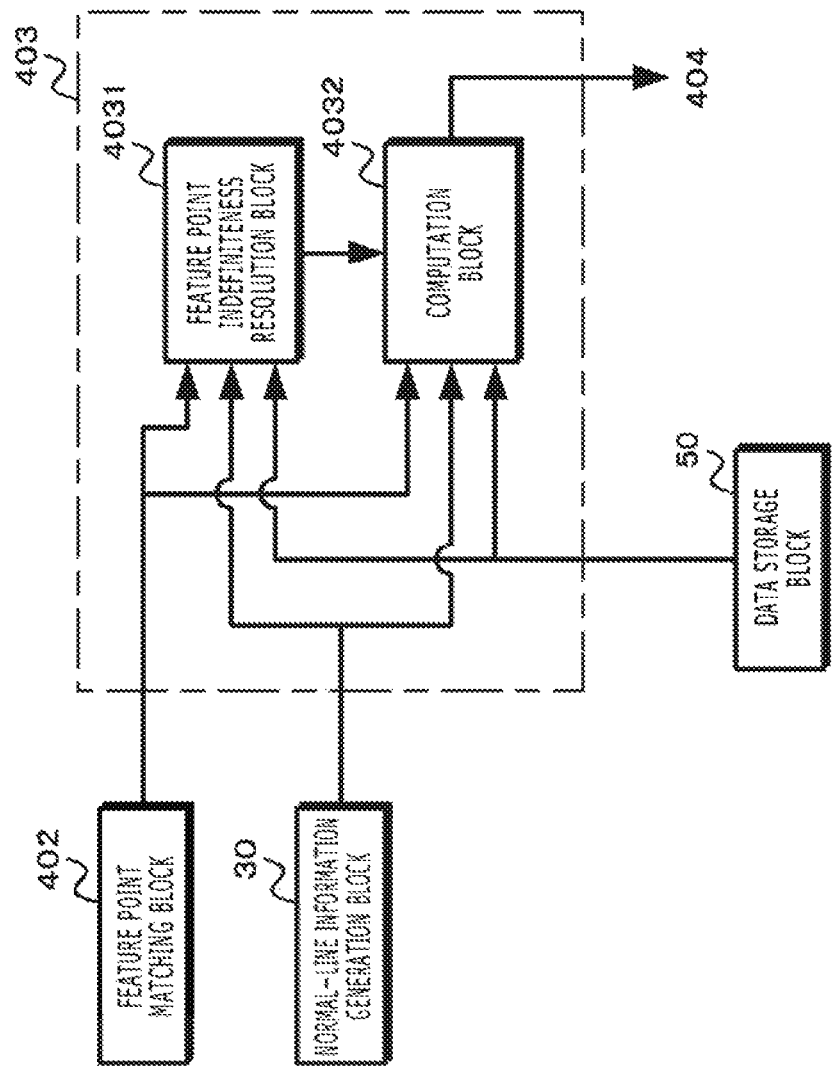
FIG. 14 is a diagram indicative of a configuration of a rotational amount detection block.

FIG. 14 depicts a configuration of the rotational amount detection block. The rotational amount detection block 403 has a feature point indefiniteness resolution block 4031 and a computation block 4032.

Figure 15:
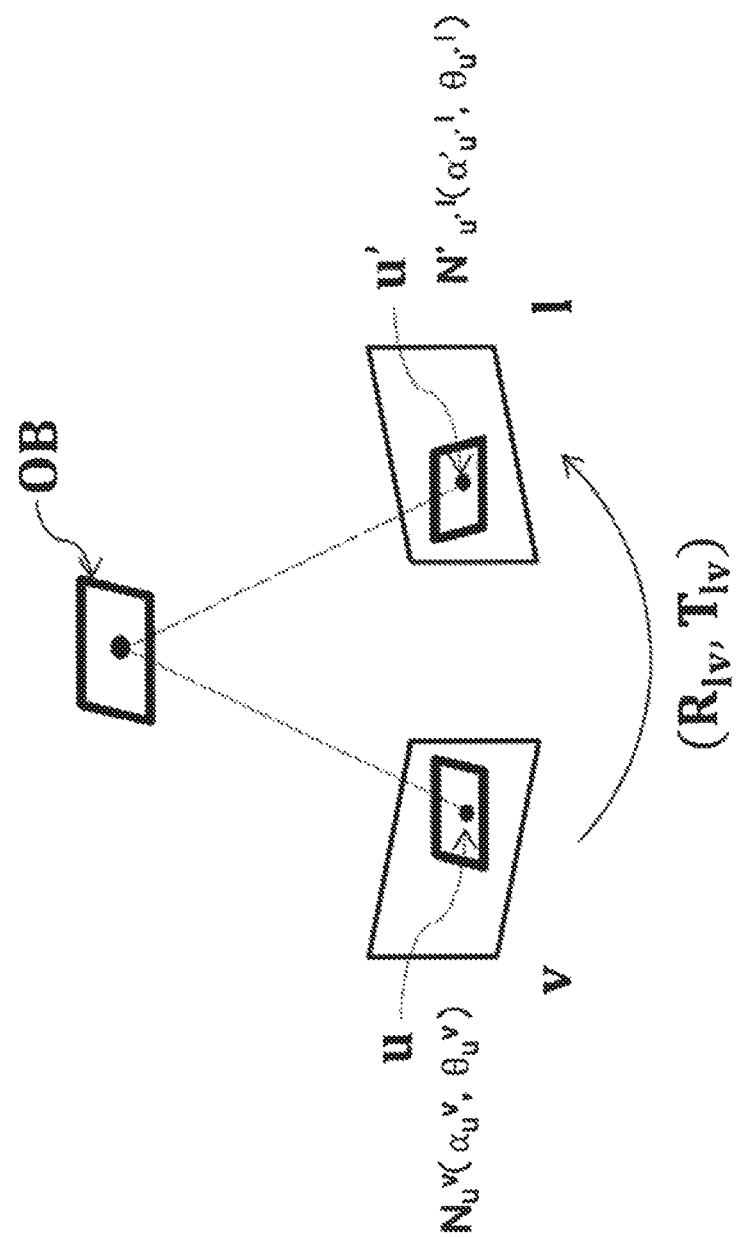
FIG. 15 is a diagram indicative of an example of an indefiniteness resolution method.

The feature point indefiniteness resolution block 4031 executes the processing of resolving indefiniteness on the normal-line information having indefiniteness. FIG. 15 depicts one example of a method of resolving indefiniteness. As depicted in FIG. 15, a feature point u' is a feature point in the current frame l and a feature point u is a feature point of the key frame v corresponding to the feature point u'. Further, let a normal-line angle having indefiniteness of the feature point u' be $N'_{u'}{}^{l}(\alpha'_{u'}{}^{l}, \theta_{u'}{}^{l})$ and a normal-line angle having no indefiniteness be $N_{u'}{}^{l}(\alpha_{u'}{}^{l}, \theta_{u'}{}^{l})$. Let a normal-line angle having no indefiniteness of the feature point u be $N_{u}{}^{v}(\alpha_{u}{}^{v}, \theta_{u}{}^{v})$. A rotational amount of the current frame relative to the key frame is $R_{lv}$ and a travel amount is $T_{lv}$.

If an azimuth angle $\alpha_{u}{}^{v}$ of the normal-line angle $N_{u}{}^{v}(\alpha_{u}{}^{v}, \theta_{u}{}^{v})$ of the key frame has no indefiniteness and a motion amount of an imaging block is small, then the feature point indefiniteness resolution block 4031 resolves the indefiniteness on the basis of equation (6) below, thereby generating the normal-line angle $N_{u'}{}^{l}(\alpha_{u'}{}^{l}, \theta_{u'}{}^{l})$. That is, the feature point indefiniteness resolution block 4031 references the azimuth angle $\alpha_{u}{}^{v}$ of the normal-line angle of the key frame so as to resolve the indefiniteness of an azimuth angle $\alpha'_{u'}{}^{l}$ of the normal-line angle $N'_{u'}{}^{l}(\alpha'_{u'}{}^{l}, \theta_{u'}{}^{l})$ having the indefiniteness of the corresponding feature point in the current frame, thereby providing an azimuth angle $\alpha_{u'}{}^{l}$.

[Math. 5]

$$\alpha_{u'}^{l} = \begin{cases} \alpha'^{l}_{u'} + 180, & \text{if } \alpha'^{l}_{u'} + 180 - \alpha_{u}^{v} < \alpha'^{l}_{u'} - \alpha_{u}^{v} \\ \alpha'^{l}_{u'} & \text{otherwise} \end{cases} \quad (6)$$

On the other hand, if the normal-line information of the key frame has indefiniteness or a motion amount of the imaging block is large, then the feature point indefiniteness resolution block 4031 resolves the indefiniteness of the normal line of the feature points of the key frame and the current frame in a statistical manner by use of a relation between the positional change of viewpoint and the change in the normal-line direction as observed from each viewpoint.

Here, if the normal-line information of the current frame has indefiniteness, a value that the normal line $N_{u'}^{1}$ of the feature point u' can take is bidirectional. If the normal line of the key frame has indefiniteness, a value that the normal line $N_{u}^{v}$ of the feature point u can take is also bidirectional. Therefore, the number of candidates for a combination of normal lines for each feature point is two (if the normal line of the key frame has no indefiniteness) or four (if the normal line of the key frame has indefiniteness). That is, the number of computed rotational amounts may be four. Hence, the feature point indefiniteness resolution block 4031 executes statistical processing over all corresponding feature points, providing a most likely rotational amount as the rotational amount $R_{lv}$. That is, the feature point indefiniteness resolution block 4031 computes a rotational amount for each combination of the normal lines of the key frame and the current frame for each feature point so as to detect the most likely rotational amount by statistically processing the computed rotational amount, thereby providing the rotational amount $R_{lv}$. In addition, the feature point indefiniteness resolution block 4031 supposes a pair $(N_{u}^{1}, N_{u}^{v})$ of the normal lines of each feature point corresponding to the rotational amount $R_{lv}$ be the normal line resolved with indefiniteness.

The computation block 4032 detects the rotational amount $R_{lv}$ by use of the normal-line information of the current frame and the key frame resolved with indefiniteness. To be more specific, the computation block 4032 computes the rotational amount $R_{lv}$ on the basis of equation (7) below by use of the normal line $N_{u'}^{1}$ without indefiniteness of the current frame and the normal line $N_{u}^{v}$ without indefiniteness of the key frame.

[Math. 6]

$$R_{lv} = \mathrm{argmin} \sum_{all(u,u')} \|N_{u'}^{1} - R_{lv}^{-1} N_{u}^{v}\|^{2} \quad (7)$$

It should be noted that, in solving equation (7) and resolving the indefiniteness of the normal line of each feature point, if the azimuth angle $\alpha_{u}^{v}$ of the normal-line angle $N_{u}^{v}(\alpha_{u}^{v}, \theta_{u}^{v})$ of the key frame has no indefiniteness and a motion amount of the imaging block is small, then only one pair of corresponding feature points is enough for the resolution of the indefiniteness of the feature point of the current frame. In addition, if the normal-line information of the key frame has indefiniteness or a motion amount of the imaging block is large, since at least two pairs of feature points are required for the computation of a most likely rotational amount by statistical processing, the number of pairs of feature points required by the rotational amount detection block 403 is one or two or more.

The travel amount detection block 404 detects a travel amount on the basis of the rotational amount $R_{lv}$ detected by the rotational amount detection block 403, the feature point detected by the feature point matching block 402, and the three-dimensional or two-dimensional position of the feature point of the key frame stored in the data storage block 50.

With respect to the position of the feature point of the key frame, the necessary number of feature points depends on whether the three-dimensional position is known or not. In what follows, a case where the three-dimensional position of the feature point is known and a case where it is unknown (the two-dimensional position is known) are described.

For example, at the time of the start of SLAM, the three-dimensional position of the feature point in the key frame is unknown. Therefore, a method for the case where the three-dimensional position of a feature point is unknown is applied. Further, if the three-dimensional position of the feature point of the key frame has been obtained by processing two or more frames, a method for the case where the three-dimensional position of a feature point is known is applied. In addition, the depth of the key frame can be obtained at the start of SLAM by use of a marker (an augmented reality (AR) marker, for example) for specifying a position through image recognition or the like. Therefore, also in such a case, the method for the case where the three-dimensional position of a feature point is known is applied.

Figure 16A:
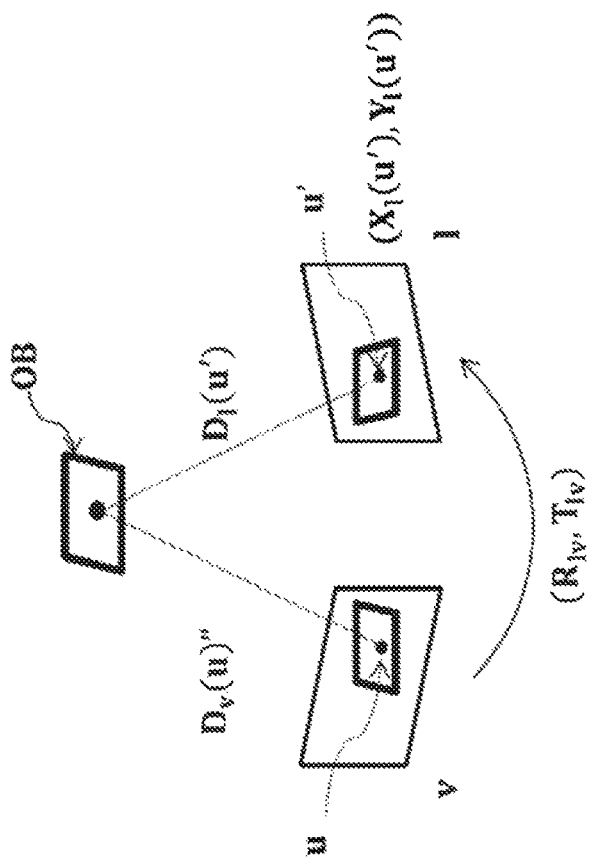
FIGS. 16(a) and 16(b) are diagrams describing detection of a travel amount.

Operation to be Executed if the Three-Dimensional Position of a Feature Point in the Key Frame is Known The travel amount detection block 404 detects a travel amount by minimizing the difference between the position at which each feature point of the key frame is re-projected to the current frame and the position of the corresponding feature point in the current frame. That is, the travel amount detection block 404 computes the travel amount $T_{lv}$ by use of equation (8) below. In equation (8), $\pi$ is indicative of a function for projecting a three-dimensional position (x, y, z) to (x/z, y/z). $\pi^{-1}(u, D_{v}(u))$ is indicative of a function for returning the feature point u on an image of the key frame to the camera space if the feature point u is depth $D_{v}(u)$ as depicted in FIG. 16(a), and K is indicative of an internal parameter matrix of the camera. $G_{lv}(\psi)$ is indicative of a motion amount (rotational amount $R_{lv}$ and travel amount $T_{lv}$) from the key frame to the current frame as indicated in equation (9) below. Further, qa in equation (8) and equations described later is indicative of all feature points to be paired.

[Math. 7]

$$T_{lv} = \mathrm{argmin} F(\psi) = \mathrm{argmin}\left(\frac{1}{2}\sum_{u \in qa}(f_{u}(\psi))^{2}\right) \quad (8)$$

$$= \mathrm{argmin}\left(\frac{1}{2}\sum_{u \in qa}(\pi(KG_{lv}(\psi)\pi^{-1}(u, D_{v}(u))) - u')^{2}\right)$$

$$G_{lv}(\psi) = G(R_{lv}, T_{lv}) = \begin{bmatrix} R_{11} & R_{12} & R_{13} & T_{1} \\ R_{21} & R_{22} & R_{23} & T_{2} \\ R_{31} & R_{32} & R_{33} & T_{3} \\ 0 & 0 & 0 & 1 \end{bmatrix} \quad (9)$$

When the travel amount $T_{lv}$ is computed by use of equation (9), there are three variables $T_{1}$, $T_{2}$, and $T_{3}$. Further, since the travel amounts in x direction and y direction of the imaging block for each pair of feature points are each computed on the basis of equation (8), if there are two or more pairs of feature points, the variables $T_{1}$, $T_{2}$, and $T_{3}$ of equation (9) can be determined on the basis of four or more equations. Therefore, the travel amount detection block 404 computes the travel amount $T_{lv}$ by use of the variables $T_{1}$, $T_{2}$, and $T_{3}$ determined by use of two or more pairs of feature points.

Operation to be Executed if the Three-Dimensional Position of a Feature Point in the Key Frame is Unknown (a Two-Dimensional Position is Known)

Figure 16B:
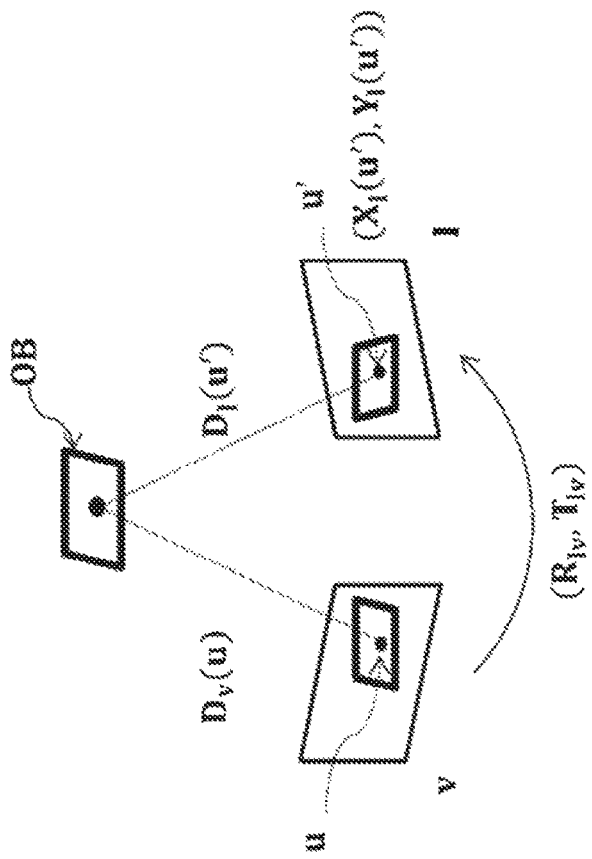

If the three-dimensional position of a feature point in the key frame is unknown, the travel amount detection block 404 detects the travel amount by minimizing the difference between the position at which each feature point of the key frame is re-projected to the current frame and the position of the corresponding feature point in the current frame. That is, the travel amount detection block 404 computes the travel amount $T_{lv}$ by use of equation (10). It should be noted that, in equation (10), the depth of the key frame is unknown, so that the depth of the feature point u of the key frame is $D_v(u)''$ as depicted in FIG. 16(b).

[Math. 8]

$$(T_{lv}, D_v'') = \mathrm{argmin} F(\psi) = \mathrm{argmin}\left(\frac{1}{2}\sum_{u \in qa}(f_u(\psi))^2\right) \quad (10)$$
$$= \mathrm{argmin}\left(\frac{1}{2}\sum_{u \in qa}(\pi(KG_{lv}(\psi)\pi^{-1}(u, D_v(u)'')) - u')^2\right)$$

Since the rotational amount $R_{lv}$ has been obtained, the number of variables of equation (10) is n (the depth of each feature point)+3 (travel amount). That is, if the number of feature points is n, 2n equations are obtained; if $2n \geq n+3$, namely, $n \geq 3$, then the depth value and the travel amount of each feature point in the key frame are obtained. Further, if the depth of each feature point in the key frame is obtained, three-dimensional coordinates $[X_f(u')\ Y_f(u')\ D_f(u')]$ in the camera coordinate system of the current frame with respect to the feature point u' of the current frame corresponding to the feature point u of the key frame can be computed on the basis of equation (11). It should be noted that $D_f(u')$ is the depth of the feature point u' in equation (11).

[Math. 9]

$$[X_f(u')Y_f(u')D_f(u')]^T = K\ G_{lv}(\psi)\pi^{-1}(u,D_v(u)'') \quad (11)$$

Executing the processing as described above by the motion amount detection block 41 allows the individual detection of a rotational amount and a travel amount on the basis of the feature points of the current frame and the key frame and the normal-line information of the feature points.

Figure 17:
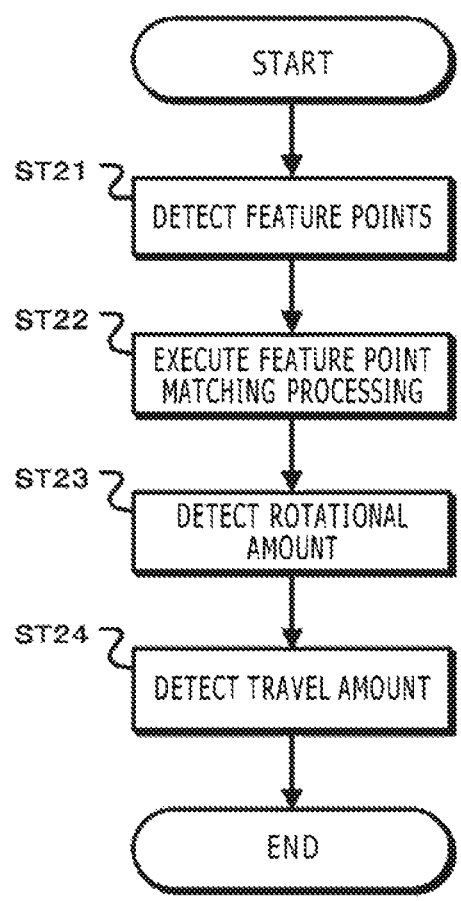
FIG. 17 is a flowchart indicative of an operation of a motion amount detection block.

FIG. 17 is a flowchart indicative of an operation of the motion amount detection block. In step ST21, the motion amount detection block 41 detects a feature point. The motion amount detection block 41 detects a feature point from a polarization image acquired by the polarization image acquisition block 20 and then goes to step ST22.

In step ST22, the motion amount detection block 41 executes feature point matching processing. The motion amount detection block 41 executes matching processing between the feature point of the key frame stored in the data storage block 50 and the feature point detected in step ST21 so as to detect a pair of corresponding feature points between the key frame and the current frame and then goes to step ST23.

In step ST23, the motion amount detection block 41 detects a rotational amount. The motion amount detection block 41 detects a rotational amount on the basis of the normal-line information having indefiniteness generated by the normal-line information generation block 30, the pair of feature points detected in step ST22, and the normal-line information of the feature point of the key frame stored in the data storage block 50.

Figure 18:
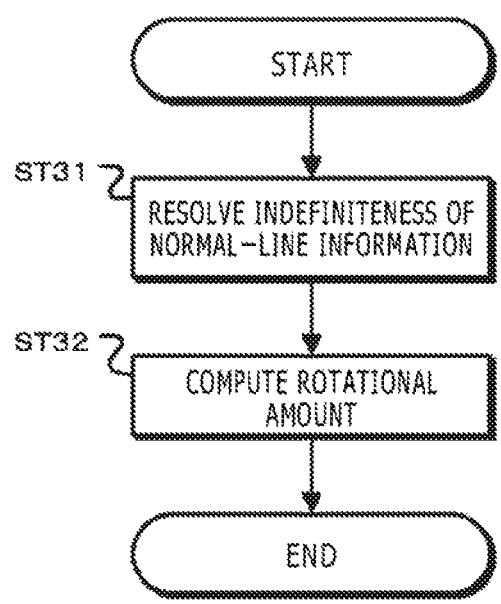
FIG. 18 is a flowchart indicative of a rotational amount detection operation.

FIG. 18 is a flowchart indicative of a rotational amount detection operation. In step ST31, the motion amount detection block 41 resolves the indefiniteness of the normal-line information. The motion amount detection block 41 executes the processing described above with reference to the feature point indefiniteness resolution block 4031 so as to resolve the indefiniteness of the normal-line information and then goes to step ST32.

In step ST32, the motion amount detection block 41 computes a rotational amount. The motion amount detection block 41 executes the processing described above with reference to the computation block 4032 so as to compute a rotational amount and then goes to step ST24 in FIG. 17.

In step ST24, the motion amount detection block 41 detects a travel amount. The motion amount detection block 41 detects a travel amount on the basis of the rotational amount $R_{lv}$ detected in step ST23, the feature point detected in step ST22, and the three-dimensional or two-dimensional position of the feature point of the key frame stored in the data storage block 50.

According to the first example as described above, the effects provided by the first embodiment described above can be obtained. Further, according to the first example, the rotational amount and the travel amount of the imaging position of the current frame relative to the imaging position of the key frame can be individually detected, so that the rotational amount of the imaging block can be correctly detected without being affected by the travel of the imaging block, for example. Therefore, as compared with the related-art SLAM in which a motion amount is detected on the basis of the information about the luminance of a taken image and the pixel position therein, the accuracy of motion amount detection can be enhanced. In addition, if a motion amount is detected on the basis of the information about the luminance of a taken image and the pixel position therein, a taken image with less texture makes it difficult to find a corresponding point between the current frame and the key frame. However, since the first example uses normal-line information, even a taken image with less texture allows the detection of a corresponding point between the current frame and the key frame if a variation in shape takes place, thereby detecting a motion amount. Further, inclusion of polarization information in a descriptor of a feature point allows the enhancement in matching accuracy as compared with the execution of matching processing on feature points by use of only an ordinary image. It should be noted that the related-art SLAM needs at least four pairs of feature points in the detection of a motion amount; however, the first example allows the detection of a motion amount only with two pairs of feature points as described above.

4. Second Example in First Embodiment

In the second example in the first embodiment, a case will be described in which a rotational and/or travel motion amount of the imaging position of a current frame relative to the imaging position of a key frame is detected on the basis of the normal-line information corresponding to each other between the key frame and the current frame and the three-dimensional position of a detected feature point of the key frame or the two-dimensional position on an image. A motion amount detection result in this case is equivalent to a result of simultaneous detection and integration of a rotational amount and a travel amount.

Figure 19:
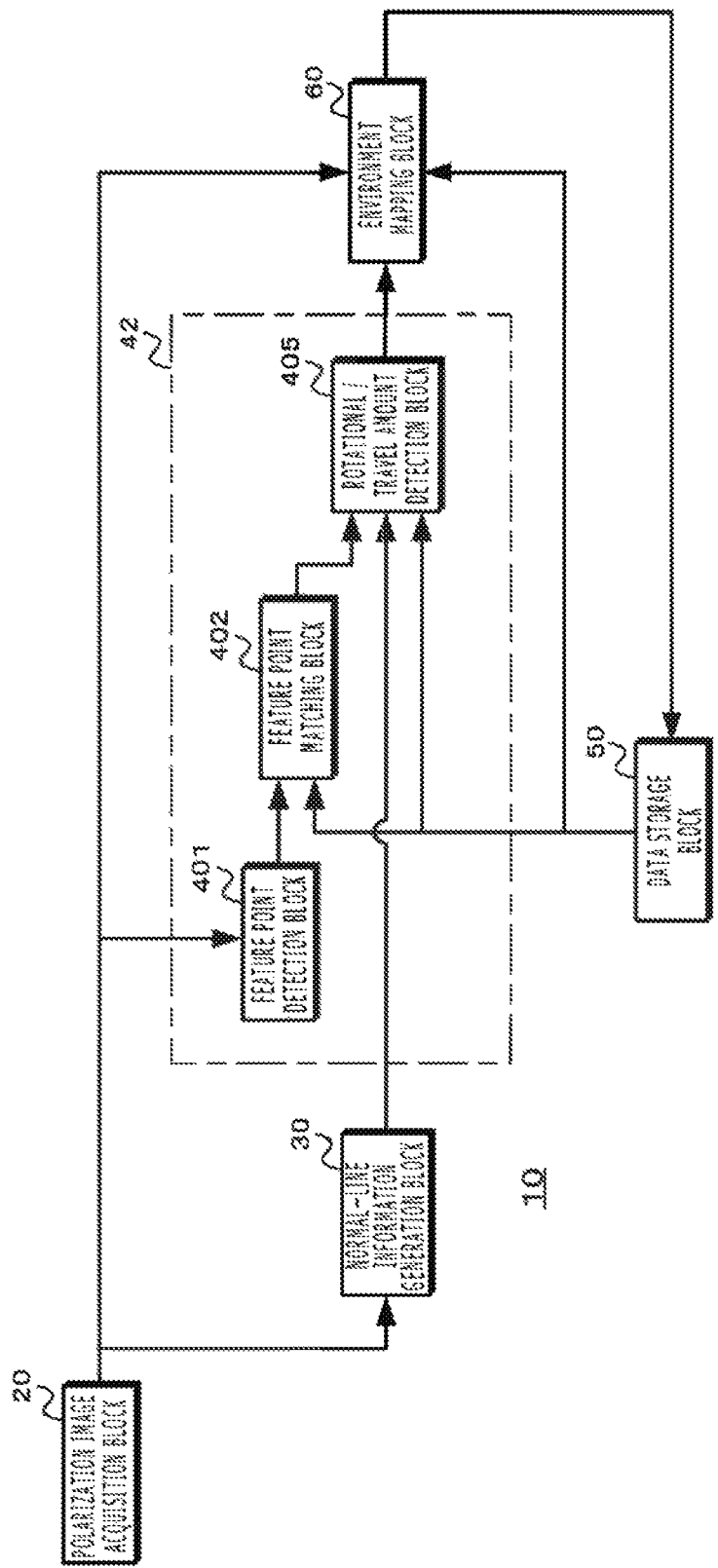
FIG. 19 is a diagram indicative of a configuration of a second example in the first embodiment.

FIG. 19 depicts a configuration of the second example in the first embodiment. An image processing apparatus in the second example has a polarization image acquisition block 20, a normal-line information generation block 30, a motion amount detection block 42, a data storage block 50, and an environment mapping block 60.

The polarization image acquisition block 20 acquires a current frame polarization image. The polarization image acquisition block 20 acquires two or more polarization images having different polarization directions; for example, polarization images having three or more polarization directions. The normal-line information generation block 30 generates normal-line information from the two or more polarization images having different polarization directions acquired by the polarization image acquisition block 20. The data storage block 50 stores data of the key frame, an environment map, and so on. The environment mapping block 60 generates a depth corresponding to the current frame polarization image and executes processing of updating the environment map by use of the generated depth, for example.

The motion amount detection block 42 detects a rotational and/or travel motion amount of an imaging position of the current frame relative to an imaging position of the key frame on the basis of a variation in the normal line of a same object imaged from different viewpoints.

The motion amount detection block 42 has a feature point detection block 401, a feature point matching block 402, and a rotational/travel amount detection block 405.

The feature point detection block 401 detects a feature point from the polarization image acquired by the polarization image acquisition block 20. The feature point detection block 401 performs averaging of pixel values of two or more polarization images or other processing for each pixel of the polarization images by use of the polarization image of the current frame acquired by the polarization image acquisition block 20 and generates a non-polarization image equivalent to an image taken without use of a polarization plate, a polarization filter or the like. In addition, the feature point detection block 401 detects a feature point of a predetermined type from the non-polarization image by use of a method such as SIFT or SURF.

The feature point matching block 402 executes matching processing between the feature point of the key frame stored in the data storage block 50 and the feature point detected by the feature point detection block 401. The feature point matching block 402 executes feature point matching processing by use of SAD or the like so as to detect a pair of feature points corresponding to each other between the key frame and the current frame.

The rotational/travel amount detection block 405 executes generally the same processing as that of the rotational amount detection block 403 described above on the normal-line information having indefiniteness generated by the normal-line information generation block 30 so as to resolve the indefiniteness of the normal-line information relative to the current frame and the key frame. Next, the rotational/travel amount detection block 405 detects a motion amount.

With generally the same method (hereafter referred to as "first related-art technique") as that described in NPL 1, in the key frame, a motion amount is detected by use of a position at which each feature point is re-projected to the current frame and a position of a corresponding feature point in the current frame. That is, a travel amount $G_{lv}$ can be computed by use of equation (12) below. In equation (12), $\pi$ is indicative of a function for projecting a three-dimensional position (x, y, z) to (x/z, y/z). $\pi^{-1}(u, D_v(u))$ is indicative of a function for returning a point u on an image to the camera space if the point u is depth $D_v(u)$, and K is indicative of an internal parameter matrix of the camera. $G_{lv}(\psi)$ is indicative of a motion amount (rotational amount $R_{lv}$ and travel amount $T_{lv}$) from the key frame to the current frame as indicated in equation (13).

[Math. 10]

$$G_{lv} = \mathrm{argmin} F(\psi) = \mathrm{argmin}\left(\frac{1}{2}\sum_{u \in qa}(f_u(\psi))^2\right) \quad (12)$$

$$= \mathrm{argmin}\left(\frac{1}{2}\sum_{u \in qa}(\pi(KG_{lv}(\psi)\pi^{-1}(u, D_v(u))) - u')^2\right)$$

$$G_{lv}(\psi) = G(R_{lv}, T_{lv}) = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix} \quad (13)$$

Figure 20:
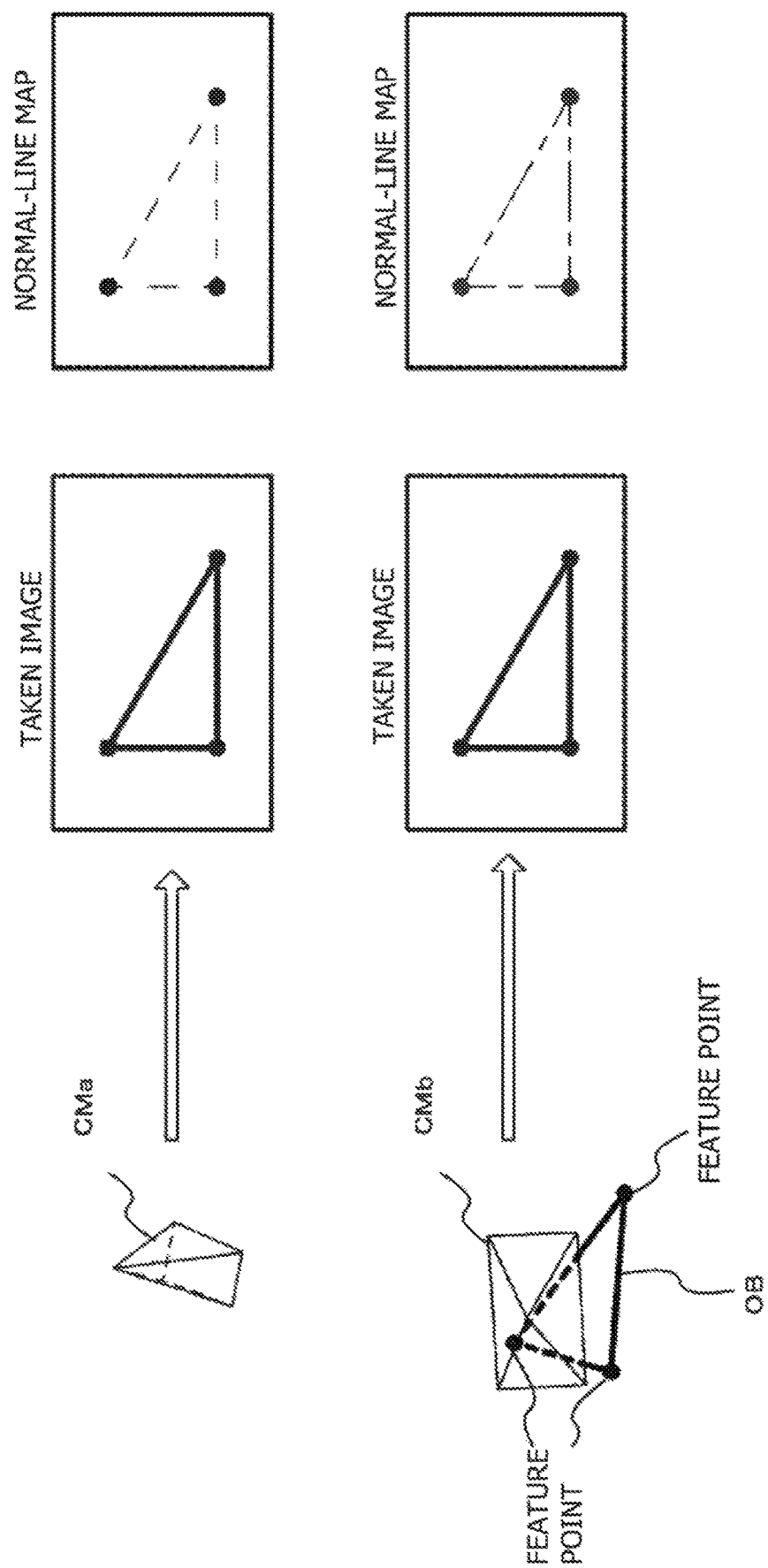
FIG. 20 is a diagram illustrating a case in which there are two points at which an object looks the same.

Here, the number of feature point pairs necessary for solving equation (12) depends on whether the depth of the feature point of the key frame is known or not. For example, in equation (12), if the depth $D_v(u)$ of the feature point u is known, then there are six variables (travel amount of three degrees of freedom+rotational amount of three degrees of freedom). Therefore, equation (12) should be solved by three pairs of feature points; however, as depicted in FIG. 20, if only the position of a feature point on the image is seen, there are two points at which the object looks the same. It should be noted that, in FIG. 20, one of the points at which the object looks the same is assumed to be an imaging position of an imaging block CMa and the other point is assumed to be an imaging position of an imaging block CMb. In this case, the positions of the feature points in images taken by the imaging blocks CMa and CMb are the same, but the normal-line maps are different from each other because of different normal-line directions. It should also be noted that, in FIG. 20, with the imaging blocks CMa and CMb, the zenith side of a quadrangular pyramid is the image sensor side and the bottom surface side is the lens side. In the normal-line maps, the difference in normal-line direction is indicated by different line types.

As described above, if there are two points at which the object looks the same, obtaining the only viewpoint requires one more feature point in addition to the three feature points. That is, in order to obtain the only $G_{lv}(\psi)$, four or more feature points are necessary.

On the other hand, if the depth $D_v(u)$ of the feature point u in the key frame is unknown, then equation (12) can be described as equation (14). For example, if the number of feature points is n, then the number of variables is six (travel amount of three degrees of freedom+rotational amount of three degrees of freedom)+n (a depth of n pairs of feature points). Therefore, if n≥6, then a depth value of each feature point and a travel amount and a rotational amount of each camera can be obtained. It should be noted that $D_v(u)''$ is indicative of a depth with the feature point u unknown.

[Math. 11]

$$(G_{lv}, D_v'') = \mathrm{argmin} F(\psi) = \mathrm{argmin}\left(\frac{1}{2}\sum_{u \in qa}(f_u(\psi))^2\right) \quad (14)$$

$$= \mathrm{argmin}\left(\frac{1}{2}\sum_{u \in qa}(\pi(KG_{lv}(\psi)\pi^{-1}(u, D_v(u)'')) - u')^2\right)$$

Since normal lines can be obtained in the feature points on the key frame and the current frame, the rotational/travel amount detection block 405 adds restrictions of the normal line of corresponding feature point to the first related-art technique such as described above by use of the different normal lines of a same point obtained from different viewpoints. Equation (15) is an equation obtained by adding restrictions of the normal lines of the corresponding feature points to the first related-art technique. That is, in equation (15), restrictions for minimizing a difference between the normal line $R_{lv}(u)N_l(u')$ of a position at which each feature point u' of the current frame is re-projected to the key frame and the normal line $N_v(u)$ of a position of the corresponding feature point u in the key frame are added. It should be noted that the normal lines $N_v(u)$, $N_l(u)$ and so on in the second example and the third example to be described later are equivalent to the normal lines $N_{u'}^v$, $N_{u'}^l$, and so on in the first example.

[Math. 12]

$$G_{lv} = \mathrm{argmin}F(\psi) = \mathrm{argmin}\left(\frac{1}{2}\sum_{u \in qa}(f_u(\psi))^2 + h_u(\psi)^2\right) \quad (15)$$
$$= \mathrm{argmin}\left(\frac{1}{2}\sum_{u \in qa}(\pi(KG_{lv}(\psi)\pi^{-1}(u, D_v(u))) - u')^2 + (R_{lv}(u)N_l(u') - N_v(u))^2\right)$$

Further, the number of feature points necessary for solving equation (15) depends on whether the depth of a feature point of the key frame is known or not. For example, in equation (15), if the depth of the feature point u is known, then there are six variables (travel amount of three degrees of freedom+rotational amount of three degrees of freedom) like the first related-art technique. However, as depicted in FIG. 20, the normal-line directions are different even with the same look. Unlike a method in which only the positional information of feature points is used in the first related-art technique, the rotational/travel amount detection block 405 also uses the normal-line directions of feature points, so that, if there are three pairs of feature points, the only solution of equation (15) described above can be obtained. Further, if the depth $D_v(u)$ of the feature point u is unknown, then equation (15) is replaced by equation (16) below.

[Math. 13]

$$(G_{lv}, D_v'') = \mathrm{argmin}F(\psi) = \mathrm{argmin}\left(\frac{1}{2}\sum_{u \in qa}(f_u(\psi))^2 + h_u(\psi)^2\right) \quad (16)$$
$$= \mathrm{argmin}\left(\frac{1}{2}\sum_{u \in qa}(\pi(KG_{lv}(\psi)\pi^{-1}(u, D_v(u)'')) - u')^2 + (R_{lv}(u)N_l(u') - N_v(u))^2\right)$$

Here, if there are n feature points, the number of variables is six (travel amount of three degrees of freedom+rotational amount of three degrees of freedom)+n (a depth of n pairs of feature points). Therefore, if n≥6, then the depth value of each feature point and the rotational and/or travel motion amount of the imaging position can be obtained. In addition, since restrictions of the normal line are added in this method, the accuracy of motion amount detection can be enhanced as compared with the first related-art technique.

Figure 21:
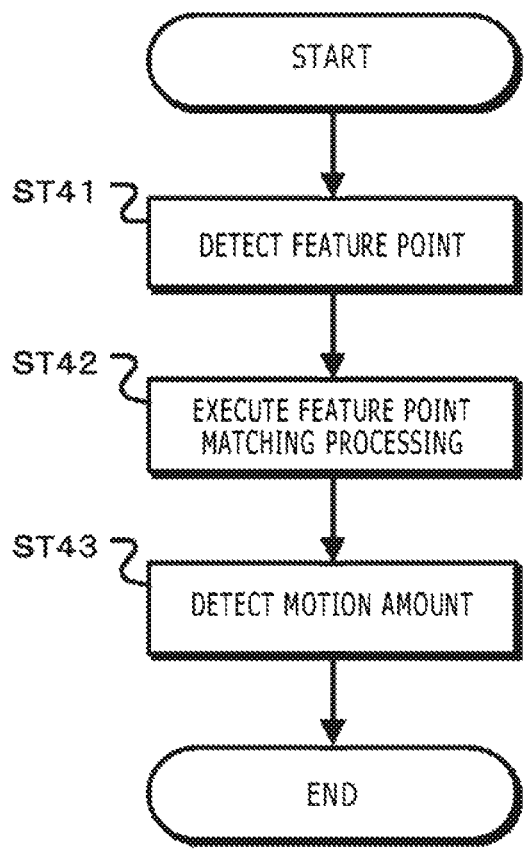
FIG. 21 is a flowchart indicative of an operation of a motion amount detection block.

FIG. 21 is a flowchart indicative of an operation of the motion amount detection block. In step ST41, the motion amount detection block 42 detects a feature point. The motion amount detection block 42 detects a feature point from the polarization image acquired by the polarization image acquisition block 20 and then goes to step ST42.

In step ST42, the motion amount detection block 42 executes feature point matching processing. The motion amount detection block 42 executes matching processing between the feature point of the key frame stored in the data storage block 50 and the feature point detected in step ST41 so as to detect a pair of corresponding feature points between the key frame and the current frame, and then goes to step ST43.

In step ST43, the motion amount detection block 42 detects a motion amount. The motion amount detection block 42 detects a motion amount on the basis of the normal-line information having indefiniteness generated by the normal-line information generation block 30, the feature point detected in step ST42, and the normal-line information of the feature point of the key frame stored in the data storage block 50.

Figure 22:
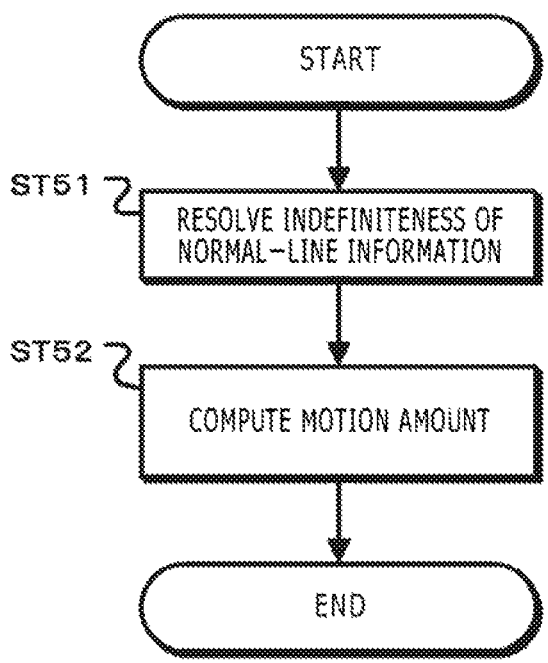
FIG. 22 is a flowchart indicative of a detection operation of a motion amount.

Referring to FIG. 22, there is depicted a flowchart indicative of a motion amount detection operation. In step ST51, the motion amount detection block 42 resolves the indefiniteness of the normal-line information. The motion amount detection block 42 executes generally the same processing as that of the feature point indefiniteness resolution block 4031 described above so as to resolve the indefiniteness of the normal-line information and then goes to step ST52.

In step ST52, the motion amount detection block 42 detects a motion amount. On the basis of the normal-line information resolved with indefiniteness and the three-dimensional position of the feature point detected from the key frame or the two-dimensional position on the image, the motion amount detection block 42 detects a rotational and/or travel motion amount as described above by use of the different normal lines of the same point obtained from different viewpoints.

According to the second example as described above, the effects provided by the first embodiment described above can be obtained. Further, in the second example, normal-line information is used, so that, if a rotational and/or travel motion amount is detected, the motion amount can be detected more accurately than the related-art techniques. Still further, since the second example uses normal-line information, even with a taken image having less texture, a corresponding point between the current frame and the key frame can be detected if there occurs a variation in shape, thereby detecting a motion amount like the first example. In addition, inclusion of polarization information in a descriptor of a feature point allows the enhancement in matching accuracy as compared with the execution of matching processing on feature points by use of only an ordinary image.

5. Third Example in First Embodiment

In the third example in the first embodiment, a case will be described in which, unlike the technique based on feature points of the first and second examples, a motion amount is detected by use of an image all over the screen.

Figure 23:
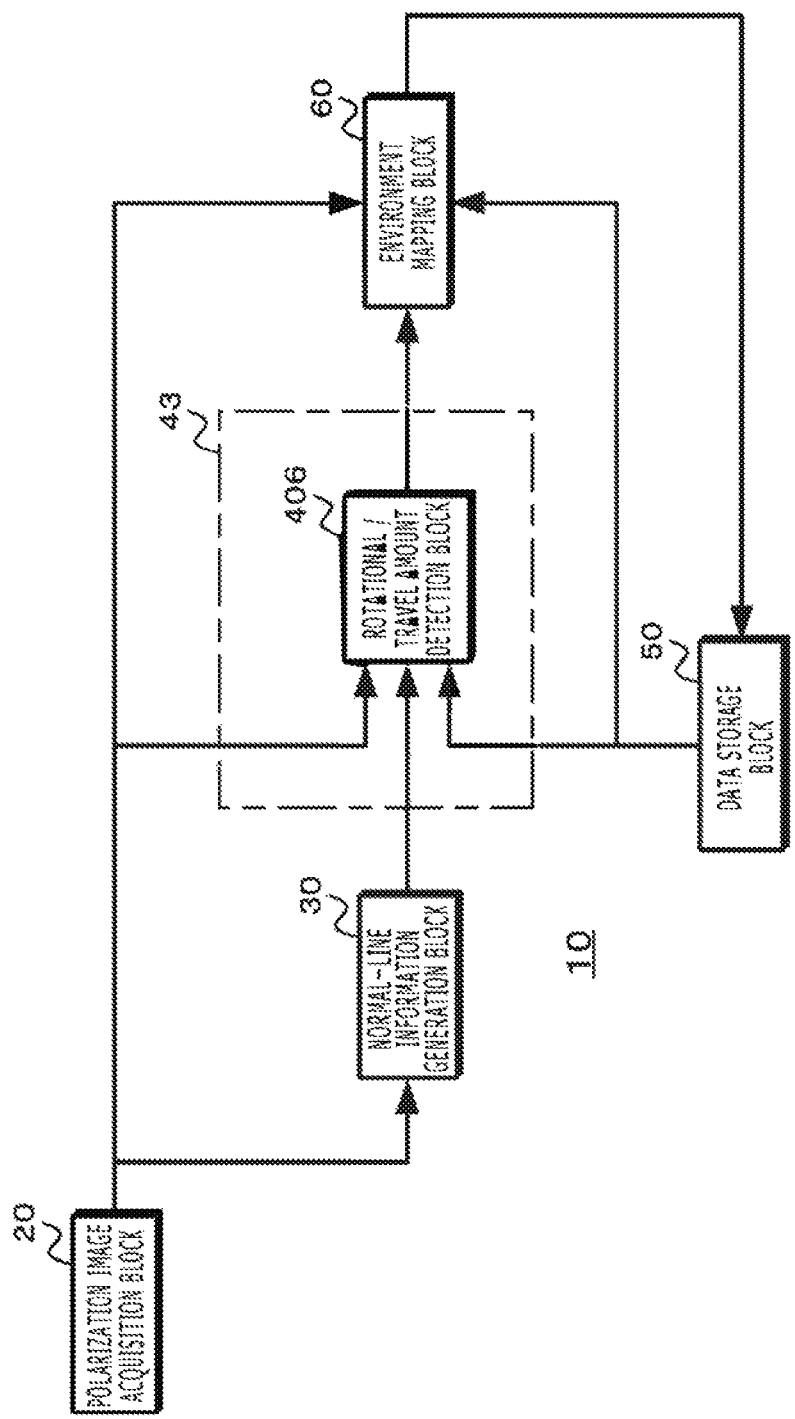
FIG. 23 is a diagram indicative of a configuration of a third example in the first embodiment.

FIG. 23 depicts a configuration of the third example in the first embodiment. An image processing apparatus of the third example has a polarization image acquisition block 20, a normal-line information generation block 30, a motion amount detection block 43, a data storage block 50, and an environment mapping block 60.

The polarization image acquisition block 20 acquires a current frame polarization image. The polarization image acquisition block 20 acquires two or more polarization images having different polarization directions; for example, polarization images having three or more polarization directions. The normal-line information generation block 30 generates normal-line information from the two or more polarization images having different polarization directions acquired by the polarization image acquisition block 20. The data storage block 50 stores data of the key frame, an environment map, and so on. The environment mapping block 60 generates a depth corresponding to the current frame polarization image and executes processing of updating the environment map by use of the generated depth, for example.

The motion amount detection block 43 has a rotational/travel amount detection block 406. On the basis of an image and normal-line information of the current frame and an image, normal-line information and a depth of the key frame, the rotational/travel amount detection block 406 detects a rotational and/or travel motion amount of an imaging position of the current frame relative to an imaging position of the key frame.

Presupposing that a three-dimensional position of the key frame be known, the rotational/travel amount detection block 406 detects a motion amount by use of luminance information and normal-line information of the key frame and the current frame. It should be noted that if a three-dimensional position of the key frame is unknown, then a motion amount is computed after obtaining a depth of the key frame by applying the technique of the first example or the second example.

With a technique based on NPL 2 (hereafter referred to as "second related-art technique"), a rotational amount and a travel amount can be computed by an ordinary image of the current frame, an ordinary image of the key frame, and a depth of the key frame. In the key frame, minimizing, for a point u at which the depth is known in the key frame, a difference between the luminance of a point re-projected to the current frame and the luminance of the point u of the key frame allows the expression by equation (17) below by use of FIG. 9.

[Math. 14]

$$G_{lv} = \text{argmin} F(\psi) = \text{argmin}\left(\frac{1}{2}\sum_{u \in qb}(f_u(\psi))^2\right) \quad (17)$$

$$= \text{argmin}\left(\frac{1}{2}\sum_{u \in qb}(I_l(\pi(KG_{lv}(\psi)\pi^{-1}(u, D_v(u)))) - I_v(u))^2\right)$$

In equation (17), I stands for the luminance of an image and qb for all points with the depth on the key frame known. Therefore, solving equation (17) can compute a motion amount. However, the second related-art technique supposes that the luminance of a same point viewed from the key frame with the viewpoint changed and from the current frame remains unchanged; in a real environment, the luminance may vary depending on the variation in a viewpoint relative to the same point, thereby causing an error in a result of the detection of a motion amount due to the luminance variation. By contrast, the rotational/travel amount detection block 406 executes the detection of a motion amount by use of normal-line information more accurately than the second related-art technique.

The rotational/travel amount detection block 406 executes processing of resolving indefiniteness from the normal-line information having indefiniteness generated by the normal-line information generation block 30. If a motion amount of the imaging block is small, for example, the rotational/travel amount detection block 406 executes generally the same processing as that of the rotational amount detection block 403 described above so as to resolve the indefiniteness of the normal-line information for the current frame. In addition, on the basis of image information, the rotational/travel amount detection block 406 may obtain an approximate value of the motion amount so as to resolve the indefiniteness of the normal line of the current frame by use of the obtained approximate value as indicated in equation (18) below. It should be note that, in equation (18), $G_{lv}(\psi)''$ is indicative of the approximation of the motion amount obtained by the second related-art technique and u' is indicative of a position that is obtained by equation (19) below.

[Math. 15]

$$\alpha_{u'}^1 = \begin{cases} \alpha_{u'}^{\prime 1} + 180, & \text{if } \alpha_{u'}^{\prime 1} + 180 - \alpha_u^v < \alpha_{u'}^{\prime 1} - \alpha_u^v \\ \alpha_{u'}^{\prime 1}, & \text{otherwise} \end{cases} \quad (18)$$

$$u' = \pi(KG_{lv}(\psi)''\pi^{-1}(u, D_v(u))) \quad (19)$$

After resolving the indefiniteness of the normal line of the current frame, the rotational/travel amount detection block 406 executes the computation of equation (20) below by use of the ordinary images of the current frame and the key frame, the normal-line information resolved with the indefiniteness, and a depth of the key frame. By executing the computation of equation (20), the rotational/travel amount detection block 406 computes a motion amount $G_{lv}$ of the imaging block for minimizing the difference in luminance between a point at which a point of the key frame is re-projected to the current frame and a corresponding point in the current frame and the difference in the normal line.

[Math. 16]

$$G_{lv} = \text{argmin} F(\psi) = \text{argmin}\left(\frac{1}{2}\sum_{u \in qb}(f_u(\psi))^2 + (h_u(\psi))^2\right) \quad (20)$$

$$= \text{argmin}\left(\frac{1}{2}\sum_{u \in qb}(I_l(\pi(KG_{lv}(\psi)\pi^{-1}(u, D_v(u)))) - I_v(u))^2 + \|R_{lv}(u)N_l(\pi(KG_{lv}(\psi)\pi^{-1}(u, D_v(u)))) - N_v(u)\|^2\right)$$

As described above, by adding restrictions of the normal line, the rotational/travel amount detection block 406 can detect a motion amount of an imaging position of the current frame relative to an imaging position of the key frame more accurately than before.

Figure 24:
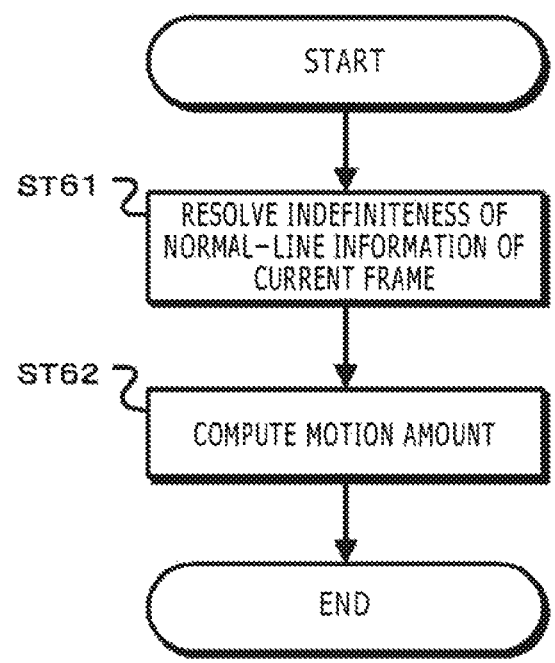
FIG. 24 is a flowchart indicative of an operation of a motion amount detection block.

FIG. 24 is a flowchart indicative of an operation of the motion amount detection block. In step ST61, the motion amount detection block 43 resolves the indefiniteness of the normal-line information of the current frame. The motion amount detection block 43 executes generally the same processing as that of the motion amount detection block 41 described above so as to resolve the indefiniteness of the normal-line information of the current frame and then goes to step ST62.

In step ST62, the motion amount detection block 43 detects a motion amount. The motion amount detection block 43 detects a motion amount on the basis of the ordinary images of the current frame and the key frame, the normal-line information of the key frame and the normal-line information of the current frame resolved with indefiniteness in step ST61, and a depth of the key frame.

According to the third example as described above, the effects indicated by the first embodiment described above can be obtained. Further, according to the third example, a motion amount can be obtained by use of an image all over the screen without executing the detection of feature points and the matching processing on feature points.

6. Second Embodiment

In the second embodiment, a case will be described in which a motion amount is detected on the basis of normal-line information without use of a polarization image.

Figure 25:
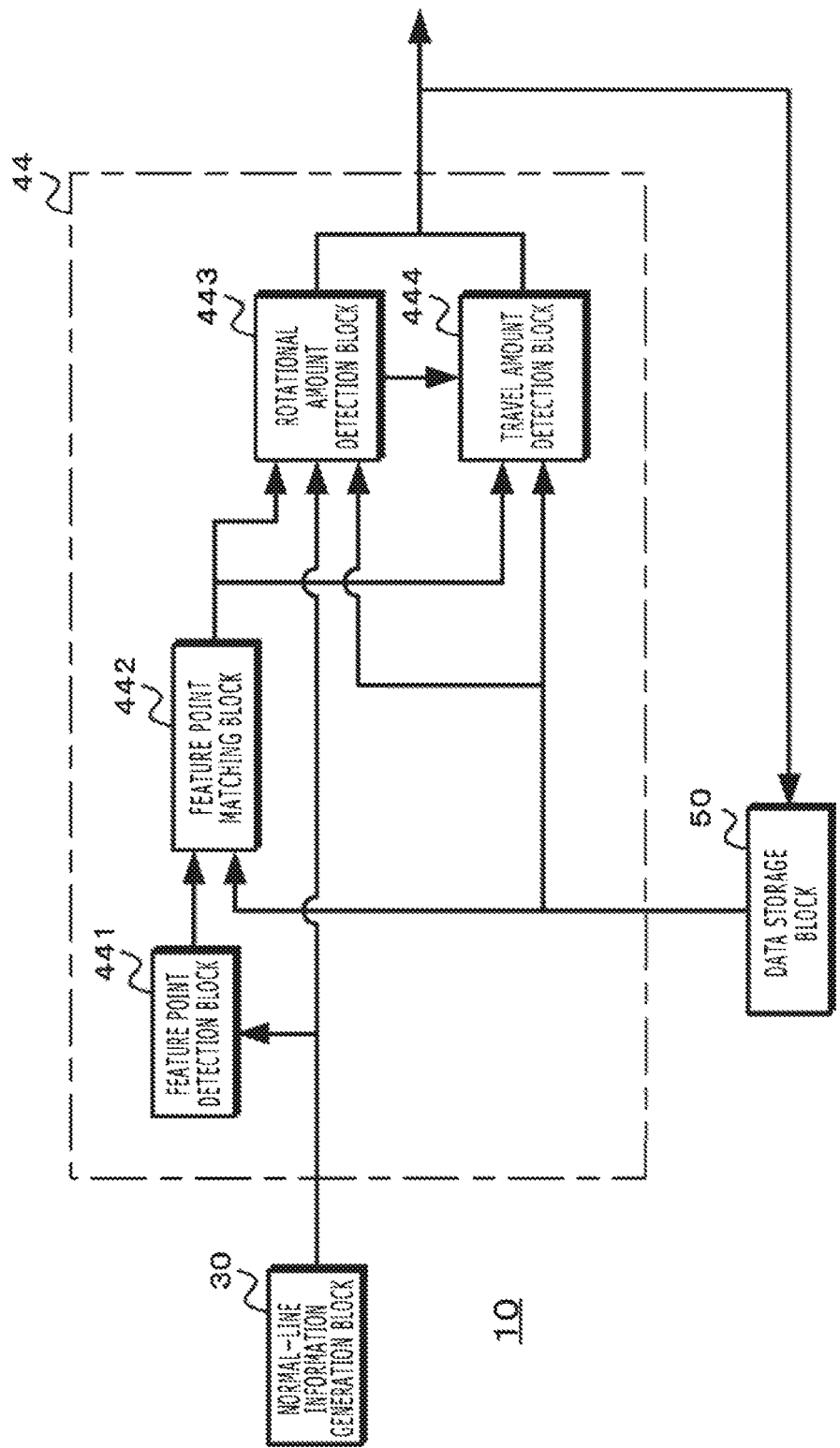
FIG. 25 is a diagram indicative of a configuration of a second embodiment.

FIG. 25 depicts a configuration of the second embodiment. An image processing apparatus has a normal-line information generation block 30, a motion amount detection block 44, and a data storage block 50. It should be noted that the normal-line information generation block 30 and the data storage block 50 are configured in generally the same manners as those of the first embodiment described above and therefore the motion amount detection block 44 will be described below.

On the basis of the normal-line information of each of the feature points corresponding between a normal-line image based on the normal-line information of the current frame and a normal-line image of the key frame, the motion amount detection block 44 detects a motion amount of an imaging position of the current frame relative to an imaging position of the key frame. The motion amount detection block 44 has a feature point detection block 441, a feature point matching block 442, a rotational amount detection block 443 and a travel amount detection block 444, the rotational amount detection block 443 and the travel amount detection block 444 making up a motion amount detection processing block.

The feature point detection block 441 detects a feature point from the normal-line information of the current frame generated by the normal-line information generation block 30. The feature point detection block 441 transforms the normal-line information into a normal-line image, for example, and detects a feature point from the normal-line image by use of a feature point detection method such as SIFT or SURF. Equation (21) below is indicative of a transform equation for transforming the normal-line information of each pixel into a normal-line image. For example, the feature point detection block 441 transforms the normal-line information into a color normal-line image by setting a red level according to a normal-line component in x direction, a green level according to a normal-line component in y direction, and a blue level according to a normal-line component in z direction.

[Math. 17]

$$\begin{bmatrix} r \\ g \\ b \end{bmatrix} = \left( \begin{bmatrix} N_x \\ N_y \\ N_z \end{bmatrix} * 0.5 + 0.5 \right) * 255 \quad (21)$$

The feature point matching block 442 executes matching processing between the feature point of the key frame stored in the data storage block 50 and the feature point detected by the feature point detection block 441. The feature point matching block 442 executes generally the same processing as that of the feature point matching block 402 described in the first example of the first embodiment so as to detect a pair of feature points corresponding to each other between the current frame and the key frame.

The rotational amount detection block 443 detects a rotational amount on the basis of the feature point detected by the feature point matching block 442, the normal-line information of the current frame generated by the normal-line information generation block 30, and the normal-line information of the feature point of the key frame stored in the data storage block 50. The rotational amount detection block 443 detects a rotational amount by executing generally the same processing as that of the rotational amount detection block 403 described in the first example described above.

The travel amount detection block 444 detects a travel amount on the basis of the rotational amount detected by the rotational amount detection block 443, the pair of feature points obtained by the feature point matching block 442, and a three-dimensional position or a two-dimensional position of the feature point of the key frame stored in the data storage block 50. The travel amount detection block 444 detects a travel amount by executing generally the same processing as that of the travel amount detection block 404 described in the first example described above.

According to the second embodiment as described above, a rotational and/or travel motion amount of an imaging position of the current frame relative to an imaging position of the key frame can be detected on the basis of normal-line information without use of a polarization image. In addition, since the second embodiment uses normal-line information, generally the same effects as those of the first embodiment can be obtained. It should be noted that, in the second embodiment, generally the same processing as that of the second example of the first embodiment may be executed by use of a feature point detected from a normal-line image so as to detect a motion amount. In this case, the motion amount detection processing block is configured in generally the same configuration as that of the rotational/travel amount detection block 405 of the second example.

7. Other Embodiments

In the first and second embodiments described above, the cases have been described in which normal-line information is generated by use of a polarization image; however, the generation of normal-line information is not restricted to one using a polarization image. For example, normal-line information may be generated by a technique known as photometric stereo. Further, normal-line information may be generated on the basis of a depth obtained by a technique such as time of flight (TOF) in which a time for a projected light to be reflected on an object and returned is measured. Still further, indefiniteness in normal-line information may be resolved by executing object recognition by use of image recognition or the like and identifying a normal line by referencing a shape presented by the recognized object.

The sequence of processing operations described herein can be executed by hardware, software, or a combination of both. In the execution of the processing by software, a program recording a processing sequence installed in a memory of a computer built in dedicated hardware is executed. Alternatively, it is practicable to execute a program installed in a general-purpose computer by which various kinds of processing operations are executable.

For example, a program may be recorded in a hard disk unit as a recording medium, a solid state drive (SSD), or a read only memory (ROM) in advance. Alternatively, a program can be stored (or recorded) in a flexible disc, a compact disc ROM (CD-ROM), a magneto optical (MO) disc, a digital versatile disc (DVD), a Blu-ray disc (BD) (registered trademark), a magnetic disc, a semiconductor memory card, and other removable recording media in a temporary or permanent manner. Such removable recording media can be provided in so-called package software.

Further, a program may not be only installed from removable recording media to a computer, but also transferred from a download site to a computer through a network such as a local area network (LAN) or the Internet in a wired or wireless manner. A computer can receive a program transferred in such a manner and install the received program into recording media such as a hard disk unit built in the computer.

The effects described herein are illustrative only and not limited thereto, and therefore additional effects not described above may be provided. The present technology should not be interpreted only in the range of the above-mentioned embodiments of the technology. The embodiments of this technology disclose the present technology in the form of illustration, so that it is to be understood by those skilled in the art that changes and variations may be made without departing from the spirit of the present technology. That is, judgement of the spirit of the present technology should be based on the reference to the scope of the claims attached hereto.

In addition, the image processing apparatus of the present technology can also take the following configuration.

(1) An image processing apparatus including:

a normal-line information generation block configured to generate normal-line information of a scene at an observation position; and a self-localization estimation block configured to estimate the observation position on the basis of the normal-line information generated by the normal-line information generation block.

(2) The image processing apparatus according to (1) above, in which the normal-line information generation block generates normal-line information of a scene at a reference position different from the observation position, and the self-localization estimation block estimates the observation position on the basis of the normal-line information of the scene at the observation position and the normal-line information of the scene at the reference position generated by the normal-line information generation block.

(3) The image processing apparatus according to (2) above, in which the self-localization estimation block has a motion amount detection block configured to detect an amount of motion from the reference position to the observation position, and an absolute position estimation block configured to estimate the observation position in a world coordinate system on the basis of the motion amount and the reference position in the world coordinate system.

(4) The image processing apparatus according to (3) above, in which the normal-line information generation block generates normal-line information of a scene corresponding to a frame subject to detection imaged at the observation position and normal-line information of a scene corresponding to a key frame imaged at a reference position different from the observation position, and the self-localization estimation block estimates the observation position on the basis of the normal-line information of the scene corresponding to the frame subject to detection and the normal-line information of the scene corresponding to the key frame generated by the normal-line information generation block.

(5) The image processing apparatus according to (4) above, in which the motion amount detection block has a feature point detection block configured to detect a feature point from an image of the frame subject to detection, a feature point matching block configured to execute matching processing between the feature point detected by the feature point detection block and a feature point detected from an image of the key frame so as to detect a pair of feature points corresponding to each other between the key frame and the frame subject to detection, a rotational amount detection block configured to detect a rotational amount of an imaging position of the frame subject to detection relative to an imaging position of the key frame on the basis of normal-line information of each of the feature points of the key frame and the frame subject to detection that are detected by the feature point matching block, and a travel amount detection block configured to detect a travel amount of the imaging position of the frame subject to detection relative to the imaging position of the key frame on the basis of the rotational amount detected by the rotational amount detection block, the feature point detected by the feature point matching block, and a three-dimensional position of the feature point of the key frame or a two-dimensional position on an image.

(6) The image processing apparatus according to (4) above, in which the motion amount detection block has a feature point detection block configured to detect a feature point from an image of the frame subject to detection, a feature point matching block configured to execute matching processing between the feature point detected by the feature point detection block and a feature point detected from an image of the key frame so as to detect a pair of feature points corresponding to each other between the key frame and the frame subject to detection, and a rotational/travel amount detection block configured to detect a rotational and/or travel motion amount of an imaging position of the frame subject to detection relative to an imaging position of the key frame on the basis of normal-line information of each of the feature points of the key frame and the frame subject to detection that are detected by the feature point matching block and a three-dimensional position of the detected feature point of the key frame or a two-dimensional position on an image.

(7) The image processing apparatus according to (4) above, in which the motion amount detection block has a rotational/travel amount detection block configured to detect a rotational and/or travel motion amount of an imaging position of the frame subject to detection relative to an imaging position of the key frame on the basis of an image and normal-line information of the frame subject to detection and an image, normal-line information and a depth of the key frame.

(8) The image processing apparatus according to (4) above, in which the motion amount detection block has a feature point detection block configured to detect a feature point from a normal-line image based on normal-line information of the frame subject to detection generated by the normal-line information generation block, a feature point matching block configured to execute matching processing between the feature point detected by the feature point detection block and a feature point detected from an image of the key frame so as to detect a pair of feature points corresponding to each other between the key frame and the frame subject to detection, and a motion amount detection processing block configured to detect a motion amount of an imaging position of the frame subject to detection relative to an imaging position of the key frame on the basis of normal-line information of each of the feature points of the key frame and the frame subject to detection that are detected by the feature point matching block.

(9) The image processing apparatus according to any one of (1) through (8) above, in which the normal-line information generation block generates the normal-line information by use of a plurality of polarization images having different polarization directions of the scene at the observation position.

(10) The image processing apparatus according to (9) above, in which the normal-line information of the scene at the observation position generated by the normal-line information generation block has indefiniteness, and the motion amount detection block resolves the indefiniteness of the normal-line information of the scene at the observation position so as to detect the motion amount by use of the normal-line information resolved with the indefiniteness.

(11) The image processing apparatus according to (9) above, further including:

a polarization image acquisition block configured to acquire the plurality of polarization images having different polarization directions of the scene at the observation position.

(12) The image processing apparatus according to (2) above, further including:

a data storage block configured to store data including at least the normal-line information of the scene at the reference position, in which the self-localization estimation block estimates the observation position by use of the data of the scene at the reference position stored in the data storage block.

(13) The image processing apparatus according to any one of (1) through (12) above, further including:

an environment mapping block configured to compute a depth of the scene at the observation position on the basis of the observation position estimated by the self-localization estimation block so as to add a three-dimensional point group based on the computed depth and the observation position to an environment map.

(14) The image processing apparatus according to (13) above, in which the environment map includes a three-dimensional position and normal-line information of the three-dimensional point group.

INDUSTRIAL APPLICABILITY

In the image processing apparatus, the image processing method, and the program according to the present technology, normal-line information of a scene at an observation position is generated and, on the basis of the generated normal-line information, the observation position is estimated. Hence, on the basis of the normal-line information of a scene corresponding to a frame subject to detection taken at an observation position and the normal-line information of a scene corresponding to a key frame taken at a reference position differing from the observation position, for example, a motion amount of an imaging position of the frame subject to detection relative to an imaging position of the key frame is accurately detected so as to estimate the observation position. That is, observation positions can be accurately detected. Therefore, the present technology is applicable to devices that generate environment maps, robots and devices of unattended operation, for example, that require the function of simultaneously executing self-localization estimate and environment mapping, and the like.

REFERENCE SIGNS LIST

10 . . . Image processing apparatus
20 . . . Polarization image acquisition block
30 . . . Normal-line information generation block
40, 41, 42, 43, 44 . . . Motion amount detection block
50 . . . Data storage block
60 . . . Environment mapping block
110 . . . Image sensor
111 . . . Polarization filter
112 . . . Lens
113 . . . Polarization plate
401, 441 . . . Feature point detection block
402, 442 . . . Feature point matching block
403, 443 . . . Rotational amount detection block
404, 444 . . . Travel amount detection block
405, 406 . . . Rotational/travel amount detection block
4031 . . . Feature point indefiniteness resolution block
4032 . . . Computation block

The invention claimed is:

1. An image processing apparatus, comprising:
a normal-line information generation block configured to:
generate first normal-line information of a scene at an observation position; and
generate second normal-line information of the scene at a reference position, wherein the reference position is different from the observation position; and
a self-localization estimation block configured to estimate the observation position based on the first normal-line information of the scene at the observation position and the second normal-line information of the scene at the reference position.

2. The image processing apparatus according to claim 1, further comprising a data storage block configured to store data including at least the second normal-line information of the scene at the reference position, wherein the self-localization estimation block is further configured to estimate the observation position by use of the data of the scene at the reference position.

3. The image processing apparatus according to claim 1, wherein the self-localization estimation block comprises:
a motion amount detection block configured to detect an amount of motion from the reference position to the observation position; and
an absolute position estimation block configured to estimate the observation position in a world coordinate system based on the amount of motion and the reference position in the world coordinate system.

4. The image processing apparatus according to claim 3, wherein
the normal-line information generation block is further configured to generate the first normal-line information of the scene corresponding to a frame imaged at the observation position and the second normal-line information of the scene corresponding to a key frame imaged at the reference position,
the frame is subject to detection, and
the self-localization estimation block is further configured to estimate the observation position based on the first normal-line information of the scene corresponding to the frame and the second normal-line information of the scene corresponding to the key frame.

5. The image processing apparatus according to claim 4, wherein the motion amount detection block comprises:
a feature point detection block configured to detect a feature point from an image of the frame;
a feature point matching block configured to execute a matching process between the feature point and a feature point detected from an image of the key frame so as to detect a pair of feature points corresponding to each other between the key frame and the frame;
a rotational amount detection block configured to detect a rotational amount of an imaging position of the frame relative to an imaging position of the key frame based on third normal-line information of each of the pair of feature points of the key frame and the frame; and
a travel amount detection block configured to detect a travel amount of the imaging position of the frame relative to the imaging position of the key frame, wherein the travel amount is detected based on the rotational amount detected by the rotational amount detection block, the feature point detected by the feature point matching block, and one of a three-dimensional position of the feature point of the key frame or a two-dimensional position on the image of the key frame.

6. The image processing apparatus according to claim 4, wherein the motion amount detection block comprises:
a feature point detection block configured to detect a feature point from an image of the frame;
a feature point matching block configured to execute a matching process between the feature point detected by the feature point detection block and a feature point detected from an image of the key frame so as to detect a pair of feature points corresponding to each other between the key frame and the frame; and
a rotational/travel amount detection block configured to detect at least one of a rotational motion amount or a travel motion amount of an imaging position of the frame relative to an imaging position of the key frame, wherein the at least one of the rotational motion amount or the travel motion amount is detected based on third normal-line information of each of the pair of feature points of the key frame and the frame and one of a three-dimensional position of the detected feature point of the key frame or a two-dimensional position on the image of the key frame.

7. The image processing apparatus according to claim 4, wherein the motion amount detection block has a rotational/travel amount detection block configured to detect at least one of a rotational motion amount or a travel motion amount of an imaging position of the frame relative to an imaging position of the key frame, wherein the at least one of the rotational motion amount or the travel motion amount is detected based on the first normal-line information of the frame and a depth of the key frame.

8. The image processing apparatus according to claim 4, wherein the motion amount detection block comprises:
a feature point detection block configured to detect a feature point from a normal-line image based on the first normal-line information of the frame;
a feature point matching block configured to execute a matching process between the feature point detected by the feature point detection block and a feature point detected from an image of the key frame so as to detect a pair of feature points corresponding to each other between the key frame and the frame; and
a motion amount detection processing block configured to detect a motion amount of an imaging position of the frame relative to an imaging position of the key frame, wherein the motion amount is detected based on third normal-line information of each of the pair of feature points of the key frame and the frame.

9. The image processing apparatus according to claim 1, wherein the normal-line information generation block is further configured to generate the first normal-line information by use of a plurality of polarization images of the scene at the observation position, the plurality of polarization images having different polarization directions.

10. The image processing apparatus according to claim 9, wherein
the first normal-line information of the scene at the observation position has indefiniteness, and
the self-localization estimation block comprises a motion amount detection block configured to:
resolve the indefiniteness of the first normal-line information of the scene at the observation position; and
detect a motion amount based on the first normal-line information resolved with the indefiniteness.

11. The image processing apparatus according to claim 9, further comprising a polarization image acquisition block configured to acquire the plurality of polarization images of the scene at the observation position.

12. The image processing apparatus according to claim 1, further comprising an environment mapping block configured to:
compute a depth of the scene at the observation position based on the observation position estimated by the self-localization estimation block; and
add a three-dimensional point group to an environment map based on the computed depth and the observation position.

13. The image processing apparatus according to claim 12, wherein the environment map includes a three-dimensional position and third normal-line information of the three-dimensional point group.

14. An image processing apparatus, comprising:
a normal-line information generation block configured to generate normal-line information of a scene at an observation position;

a self-localization estimation block configured to estimate the observation position based on the normal-line information generated by the normal-line information generation block; and an environment mapping block configured to:
  compute a depth of the scene at the observation position based on the observation position estimated by the self-localization estimation block; and
  add a three-dimensional point group to an environment map based on the computed depth and the observation position.

15. An image processing method, comprising:
  generating, by a normal-line information generation block, first normal-line information of a scene at an observation position;
  generating, by the normal-line information generation block, second normal-line information of the scene at a reference position, wherein the reference position is different from the observation position; and
  estimating, by a self-localization estimation block, the observation position based on the first normal-line information of the scene at the observation position and the second normal-line information of the scene at the reference position.

16. A non-transitory computer-readable medium, having stored thereon, computer-executable instructions, which when executed by a processor of an image processing apparatus, cause the processor to execute operations, the operations comprising:
  generating first normal-line information of a scene at an observation position;
  generating second normal-line information of the scene at a reference position, wherein the reference position is different from the observation position; and
  estimating the observation position based on the first normal-line information of the scene at the observation position and the second normal-line information of the scene at the reference position.

17. An image processing apparatus, comprising:
  a normal-line information generation block configured to generate normal-line information of a scene at an observation position, wherein the normal-line information is generated by use of a plurality of polarization images of the scene at the observation position, the plurality of polarization images having different polarization directions; and
  a self-localization estimation block configured to estimate the observation position based on the normal-line information generated by the normal-line information generation block.

* * * * *